United States Patent
Sundstrom et al.

(10) Patent No.: US 8,350,665 B1
(45) Date of Patent: Jan. 8, 2013

(54) RFID READER SYSTEMS DETECTING PILOT TONE

(75) Inventors: Kurt E. Sundstrom, Woodinville, WA (US); Scott A. Cooper, Seattle, WA (US); Amir Sarajedini, Aliso Viejo, CA (US); Aanand Esterberg, Seattle, WA (US); Todd E. Humes, Shoreline, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 13/407,742

(22) Filed: Feb. 28, 2012

Related U.S. Application Data

(63) Continuation of application No. 11/622,092, filed on Jan. 11, 2007, now abandoned.

(60) Provisional application No. 60/760,150, filed on Jan. 18, 2006.

(51) Int. Cl.
| | |
|---|---|
| G05B 23/02 | (2006.01) |
| G05B 11/01 | (2006.01) |
| H04Q 5/22 | (2006.01) |
| H04B 7/14 | (2006.01) |
| H04B 1/16 | (2006.01) |
| G06F 7/00 | (2006.01) |
| H03D 3/00 | (2006.01) |

(52) U.S. Cl. ...... 340/3.2; 340/3.6; 340/10.1; 340/12.51; 455/339; 455/18; 708/200; 708/208; 329/318; 329/319

(58) Field of Classification Search .......................... None
See application file for complete search history.

(56) References Cited

U.S. PATENT DOCUMENTS

| | | | |
|---|---|---|---|
| 4,739,328 A | 4/1988 | Koelle et al. | |
| 6,265,962 B1 | 7/2001 | Black et al. | |
| 6,317,028 B1 | 11/2001 | Valiulis | |
| 6,512,478 B1 | 1/2003 | Chien | |
| 6,590,881 B1 | 7/2003 | Wallace et al. | |
| 6,617,963 B1 | 9/2003 | Watters et al. | |
| 7,142,815 B2 | 11/2006 | Desjeux et al. | |
| 7,369,036 B1 | 5/2008 | Vacherand et al. | |
| 7,419,096 B2 | 9/2008 | Esterberg et al. | |
| 7,498,924 B2 | 3/2009 | Scherabon | |
| 7,710,239 B2 | 5/2010 | Kranz | |
| 7,741,956 B1 | 6/2010 | Nysen | |
| 7,787,852 B2 | 8/2010 | Rofougaren | |
| 2005/0237160 A1 | 10/2005 | Nolan et al. | |
| 2005/0269408 A1 | 12/2005 | Esterberg et al. | |

OTHER PUBLICATIONS

Final Office Action U.S. Appl. No. 11/622,066 mailed Mar. 6, 2012.
Non-Final Office Action U.S. Appl. No. 11/622,066 mailed Sep. 20, 2011.

(Continued)

*Primary Examiner* — Jennifer Mehmood
*Assistant Examiner* — Pameshanand Mahase
(74) *Attorney, Agent, or Firm* — Turk IP Law, LLC

(57) ABSTRACT

RFID tags are commanded to generate a pilot tone in their backscatter. When the backscattered pilot tone is received in the reader, the pilot tone is used to estimate the tag period/frequency. Then, the estimate is used to seed and lock a symbol timing recovery loop, which provides a detected signal to one or more correlators for detecting the tag preamble. A delayed version of the received tag signal is compared against a baseline signal threshold established from the received signal to detect the pilot tone.

21 Claims, 21 Drawing Sheets

*PILOT TONE DETECTION*
*CIRCUIT BLOCK DIAGRAM*

OTHER PUBLICATIONS

"Declaration of Stacy L. Jones authenticating attached website materials", www.autoid.org/SC31/sc_31_wg4_sg3.htm, Sep. 1, 2006.

Erup, Lars et al. "Interpolation in Digital Modems—Part II: Implementation and Performance, "IEEE Transactions on Communications"", vol. 41, No. 6, Jun. 1993, 998-1008.

Gardner, Floyd M. "Interpolation in Digital Modems—Part I: Fundamentals, "IEEE Transactions on Communications"", vol. 41, No. 3, Mar. 1993, 501-507.

EPCglobal, Inc, , "Specification of RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec") EPCglobal Inc., http://www.epcglobalinc.org, Dec. 17, 2005.

EPCglobal, Inc, "Specification of RFID Air Interface-EPC Radio-Frequency Identity Protocols Class-1 Generation-2 UHF RFID Protocol for Communications at 860 MHz-960 MHz, Version 1.0.8." (a.k.a. "The Gen 2 Spec") EPCglobal Inc. http://www.epcglobalinc.com, Dec. 14, 2004.

Litwin, Louis "Matched Filtering and Timing Recovery in Digital Receivers", Retrieved from http://www.teilar.gr/dbData/ProfAnn/profann-44e04051.pdf, Sep. 2001, 32-48.

Kim, et al., ""Design of Optimal Interpolation Filter for Symbol Timing Recovery" IEEE Transaction on Communications", vol. 45 No. 7, Jun. 1997, 877-884.

RFID READER SYSTEM CONFIGURATION WITH
OPTIONAL LOCAL AND REMOTE COMPONENTS

*FMO PREAMBLE WITHOUT PILOT TONE*

*MILLER PREAMBLES WITHOUT PILOT TONE*

1100

| Commands | DR | M | TRext | Sel | Session | Target | Q | CRC-5 |
|---|---|---|---|---|---|---|---|---|
| # of Bits | 4 | 1 | 2 | 1 | 2 | 2 | 1 | 4 | 5 |
| Description | 1100 | 0: DR=8<br>1: DR=64/8 | 00: M=1<br>01: M=2<br>11: M=4<br>12: M=8 | 0: No Pilot Tone<br>1: Use Pilot Tone | 00: All<br>01: All<br>11: ~SL<br>12: SL | 00: S0<br>01: S1<br>11: S2<br>12: S3 | 0: A<br>1: B | 0-12 | |

*COMMANDING THE TAG TO ALSO SEND A PILOT TONE ...*

1270

*... THE TAG ALSO SENDS A PILOT TONE,
WHICH REVEALS THE TAG BACKSCATTER
LINK FREQUENCY*

*TIME BASE AND TIMING ACQUISITION COMPONENT FOR RECOVERING TAG'S PREAMBLE*

*TIME BASE AND TIMING ACQUISITION COMPONENT FOR RECOVERING TAG'S PREAMBLE*

BUFFER / DELAY BLOCK

BUFFER / DELAY BLOCK

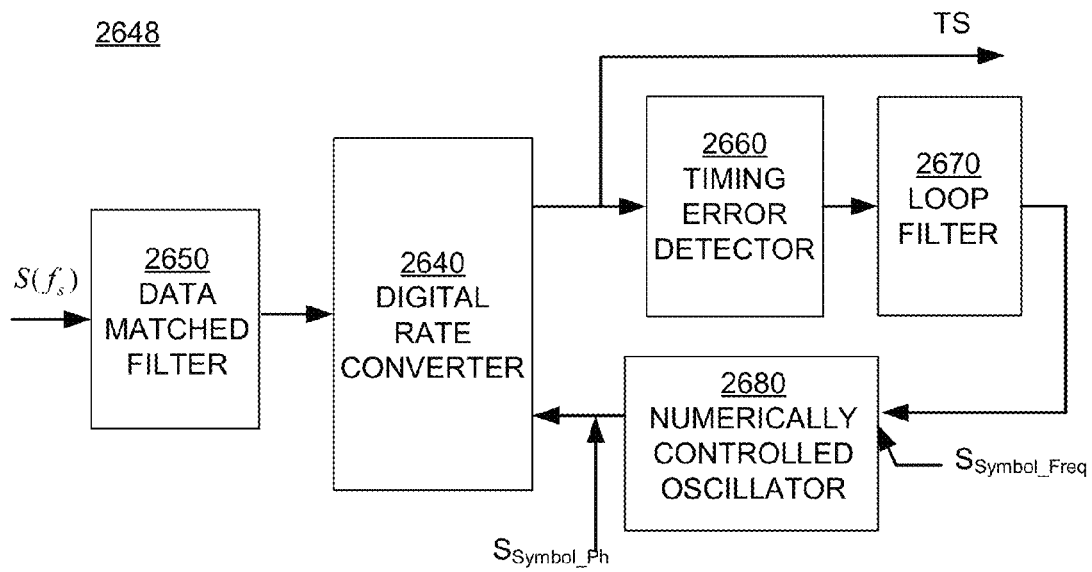
FIG. 26  *SYMBOL TIMING RECOVERY LOOP*
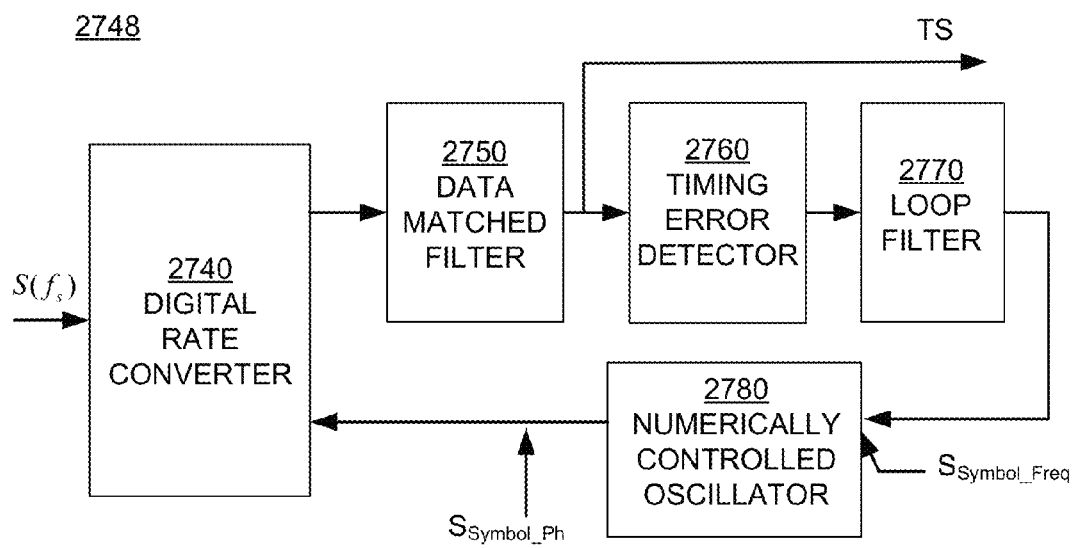
*SYMBOL TIMING RECOVERY LOOP*
FIG. 27

RFID READER SYSTEMS DETECTING PILOT TONE

RELATED APPLICATIONS

This utility patent application is a continuation of U.S. patent application Ser. No. 11/622,092 (IMPJ-0179) filed on Jan. 11, 2007. The benefit of the earlier filing date of the parent applications is hereby claimed under 35 U.S.C. §120. The parent application is incorporated herein by reference.

This utility patent application claims the benefit of U.S. Provisional Application Ser. No. 60/760,150 filed on Jan. 18, 2006, which is hereby claimed under 35 U.S.C. §119(e). The provisional application is incorporated herein by reference.

This utility patent application is a continuation-in-part (CIP) of U.S. patent application Ser. No. 11/136,948 (IMPJ-0098) filed on Aug. 19, 2004. The benefit of the earlier filing date of the parent applications is hereby claimed under 35 U.S.C. §120. The parent application is incorporated herein by reference.

This application may be found to be related to the following application, which is incorporated herein by reference: Application titled "RFID READER SYSTEMS AIDED BY RF POWER MEASUREMENT", by inventors Scott A. Cooper and Christopher J. Diorio filed with the USPTO on the same day as the present application, and due to be assigned to the same assignee (Ser. No. 11/622,066).

This application may also be found to be related to the following application, which is incorporated herein by reference: Application titled "RFID READER SYSTEMS WITH DIGITAL RATE CONVERSION", by inventor Kurt E. Sundstrom filed with the USPTO on the same day as the present application, and due to be assigned to the same assignee (Ser. No. 11/622,140).

All three related applications are incorporated herein by reference.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

In a typical reader-tag communication, the reader and the tag clocks are not synchronous in frequency or phase. Therefore, the reader has to recover the timing information from the received tag signal. To accomplish that the reader needs to estimate and track symbol rate (frequency) and symbol phase (temporal boundaries).

There is a wide variance of when tag responses can be received for detection. Moreover, the tag and reader clocks are not synchronized for their period and/or phase. The response is due after many cycles of these clocks. So, even small discrepancies in their synchronization may accumulate resulting in potentially large variances of time and frequency. Therefore, not only are the tag and reader clocks not synchronized in an RFID communication, but the frequency errors may be much larger than in traditional wireless communications systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to commanding an RFID tag to generate a pilot tone in its backscatter. When the backscattered pilot tone is received in the reader, the pilot tone may be used to estimate the tag period/frequency. Then, the estimate may be used to seed and lock a symbol timing recovery loop, which provides a detected signal to a correlator for detecting the tag preamble. According to some embodiments, a delayed version of the received tag signal may be compared against a baseline signal threshold established from the received signal, and detection of the pilot tone determined based on the comparison.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

FIG. 26 is a block diagram of a symbol timing recovery loop block of the diagram of FIG. 16 according to an embodiment;

FIG. 27 is a block diagram of a symbol timing recovery loop block of the diagram of FIG. 16 according to other embodiments;

DETAILED DESCRIPTION

Figure 1:
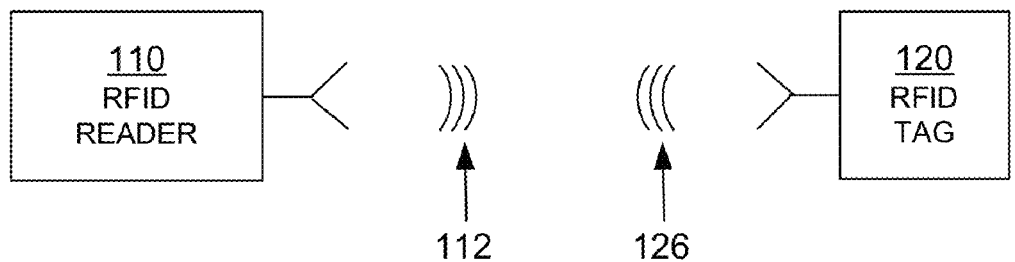
FIG. 1 is a block diagram of components of an RFID system.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
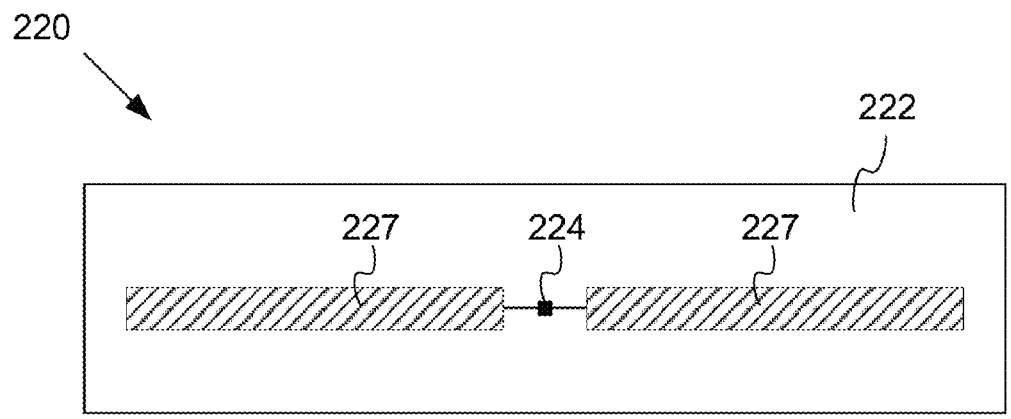
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that at, the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
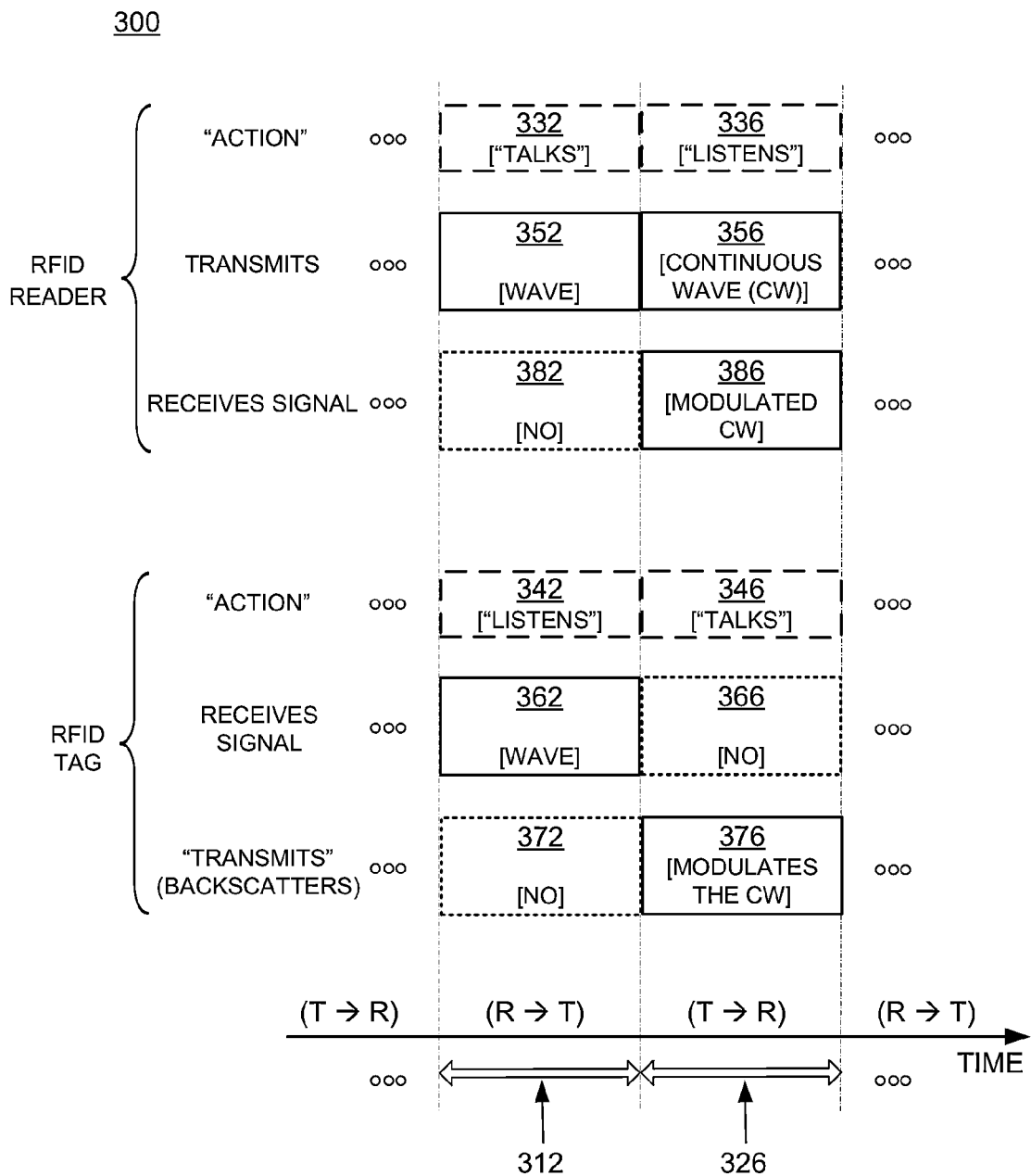
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
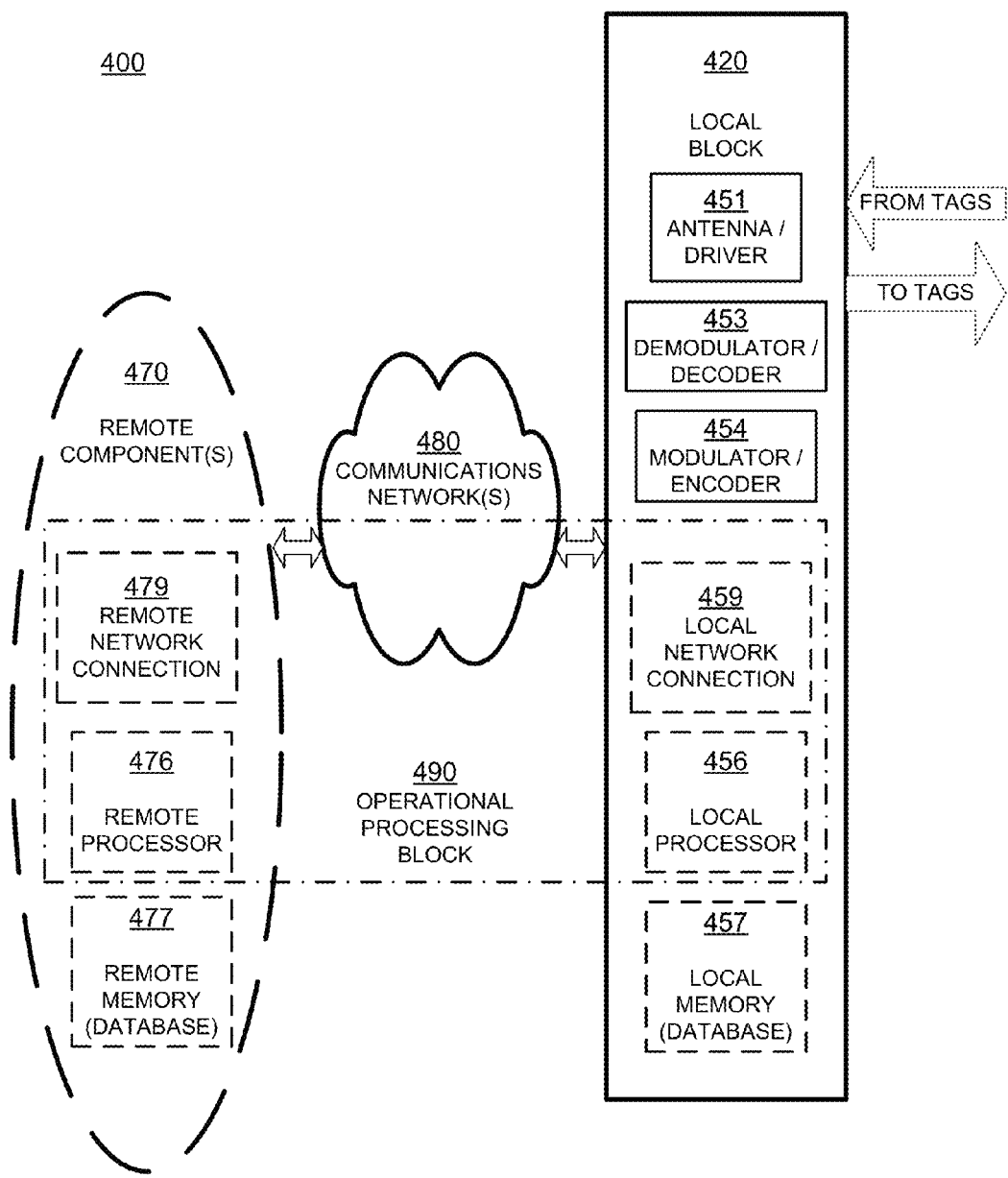
FIG. 4 is a block diagram of a whole RFID reader system according to embodiments.

FIG. 4 is a block diagram of a whole RFID reader system 400 according to embodiments. System 400 includes a local block 420, and optionally remote components 470. Local block 420 and remote components 470 can be implemented in any number of ways. It will be recognized that reader 110 of FIG. 1 is the same as local block 420, if remote components 470 are not provided. Alternately, reader 110 can be implemented instead by system 400, of which only the local block 420 is shown in FIG. 1.

Local block 420 is responsible for communicating with the tags. Local block 420 includes a block 451 of an antenna and a driver of the antenna for communicating with the tags. Some readers, like that shown in local block 420, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna block 451. Modulator/encoder block 454 encodes and modulates an RF wave that is to be transmitted to the tags via antenna block 451.

Local block 420 additionally includes an optional local processor 456. Processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 453, the encoding function in block 454, or both, may be performed instead by processor 456.

Local block 420 additionally includes an optional local memory 457. Memory 457 may be implemented in any number of ways known in the art. Such ways include, by way of examples and not of limitation, nonvolatile memories (NVM), read-only memories (ROM), random access memories (RAM), any combination of one or more of these, and so on. Memory 457, if provided, can include programs for processor 456 to run, if provided.

In some embodiments, memory 457 stores data read from tags, or data to be written to tags, such as Electronic Product Codes (EPCs), Tag Identifiers (TIDs) and other data. Memory 457 can also include reference data that is to be compared to the EPC codes, instructions and/or rules for how to encode commands for the tags, modes for controlling antenna 451, and so on. In some of these embodiments, local memory 457 is provided as a database.

Some components of local block 420 typically treat the data as analog, such as the antenna/driver block 451. Other components such as memory 457 typically treat the data as digital. At some point there is a conversion between analog and digital. Based on where this conversion occurs, a whole reader may be characterized as "analog" or "digital", but most readers contain a mix of analog and digital functionality.

If remote components 470 are indeed provided, they are coupled to local block 420 via an electronic communications network 480. Network 480 can be a Local Area Network (LAN), a Metropolitan Area Network (MAN), a Wide Area Network (WAN), a network of networks such as the internet, and so on. In turn, local block 420 then includes a local network connection 459 for communicating with network 480.

There can be one or more remote component(s) 470. If more than one, they can be located at the same place with each other, or in different places. They can access each other and local block 420 via network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Processor 476 can be made in any way known in the art, such as was described with reference to local processor 456.

Remote component(s) 470 can also include a remote memory 477. Memory 477 can be made in any way known in the art, such as was described with reference to local memory 457. Memory 477 may include a local database, and a different database of a Standards Organization, such as one that can reference EPCs.

Of the above-described elements, it is advantageous to consider a combination of these components, designated as operational processing block 490. Block 490 includes those that are provided of the following: local processor 456, remote processor 476, local network connection 459, remote network connection 479, and by extension an applicable portion of network 480 that links connection 459 with connection 479. The portion can be dynamically changeable, etc. In addition, block 490 can receive and decode RF waves received via antenna 451, and cause antenna 451 to transmit RF waves according to what it has processed.

Block 490 includes either local processor 456, or remote processor 476, or both. If both are provided, remote processor 476 can be made such that it operates in a way complementary with that of local processor 456. In fact, the two can cooperate. It will be appreciated that block 490, as defined this way, is in communication with both local memory 457 and remote memory 477, if both are present.

Accordingly, block 490 is location agnostic, in that its functions can be implemented either by local processor 456, or by remote processor 476, or by a combination of both. Some of these functions are preferably implemented by local processor 456, and some by remote processor 476. Block 490 accesses local memory 457, or remote memory 477, or both for storing and/or retrieving data.

Reader system 400 operates by block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing block 490.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as a combination of hardware and software. It is advantageous to consider such a system as subdivided into components or modules. A person skilled in the art will recognize that some of these components or modules can be implemented as hardware, some as software, some as firmware, and some as a combination. An example of such a subdivision is now described.

Figure 5:
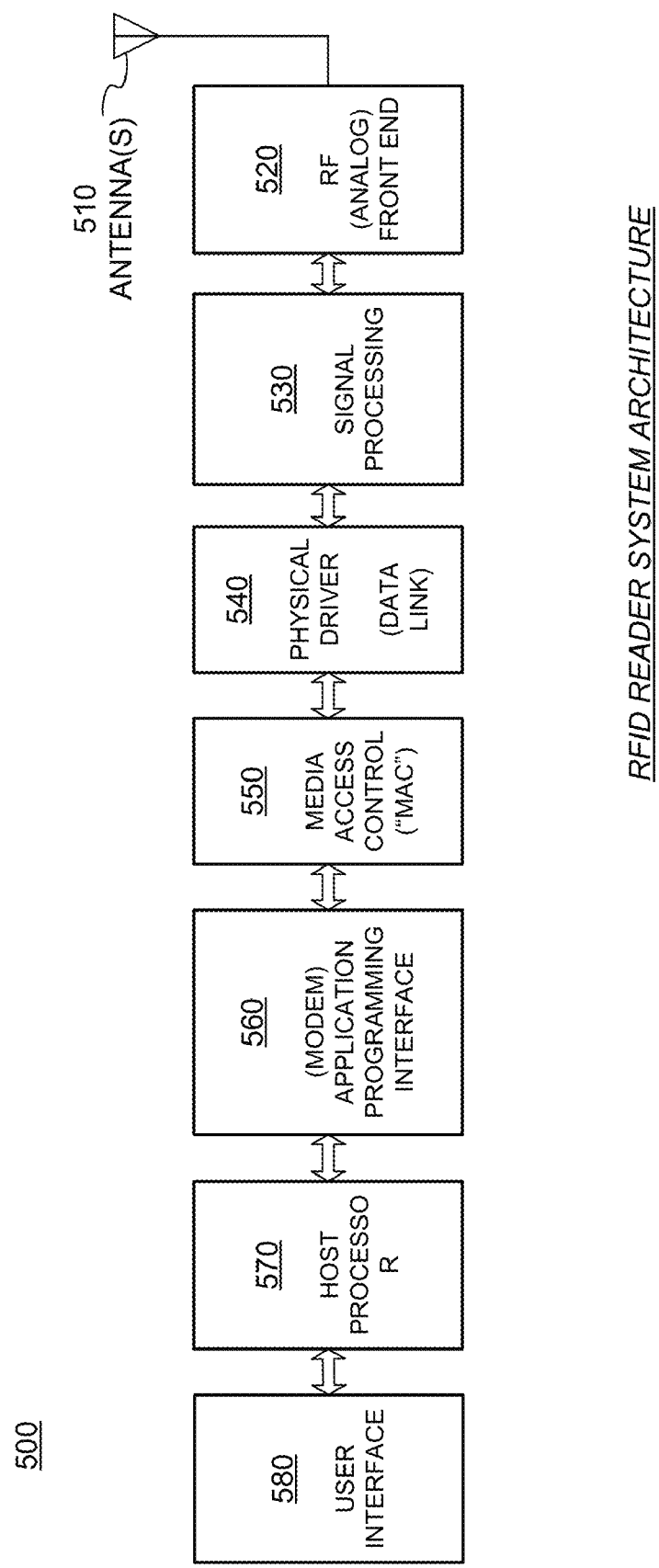
FIG. 5 is a block diagram illustrating an overall architecture of a RFID reader system according to embodiments.

FIG. 5 is a block diagram illustrating an overall architecture of a RFID reader system 500 according to embodiments. It will be appreciated that system 500 is considered subdivided into modules or components. Each of these modules may be implemented by itself, or in combination with others. It will be recognized that some aspects are parallel with those of FIG. 3. In addition, some of them may be present more than once.

RFID reader system 500 includes one or more antennas 510, and an RF Front End 520, for interfacing with antenna(s) 510. These can be made as described above. In addition, Front End 520 typically includes analog components.

System 500 also includes a Signal Processing module 530. In this embodiment, module 530 exchanges waveforms with Front End 520, such as I and Q waveform pairs. In some embodiments, signal processing module 530 is implemented by itself in an FPGA.

System 500 also includes a Physical Driver module 540, which is also known as Data Link. In this embodiment, module 540 exchanges bits with module 530. Data Link 540 can be the stage associated with framing of data. In one embodiment, module 540 is implemented by a Digital Signal Processor.

System 500 additionally includes a Media Access Control module 550, which is also known as MAC layer. In this embodiment, module 550 exchanges packets of bits with module 550. MAC layer 550 can be the stage for making decisions for sharing the medium of wireless communication, which in this case is the air interface. Sharing can be between reader system 500 and tags, or between system 500 with another reader, or between tags, or a combination. In one embodiment, module 550 is implemented by a Digital Signal Processor.

System 500 moreover includes an Application Programming Interface module 560, which is also known as API, Modem API, and MAPI. In some embodiments, module 560 is itself an interface for a user.

System 500 further includes a host processor 570. Processor 570 exchanges signals with MAC layer 550 via module 560. In some embodiments, host processor 570 is not considered as a separate module, but one that includes some of the above-mentioned modules of system 500. A user interface 580 is coupled to processor 570, and it can be manual, automatic, or both.

Host processor 570 can include applications for system 500. In some embodiments, elements of module 560 may be distributed between processor 570 and MAC layer 550. It will be observed that the modules of system 500 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 510 as signals, which are in turn processed successively by the various modules in the chain. Processing can terminate in any one of the modules. In a transmitting mode, initiation can be in any one of these modules. That, which is to be transmitted becomes ultimately signals for antenna(s) 510 to transmit as wireless waves.

The architecture of system 500 is presented for purposes of explanation, and not of limitation. Its particular subdivision into modules need not be followed for creating embodiments according to the invention. Furthermore, the features of the invention can be performed either within a single one of the modules, or by a combination of them.

An economy is achieved in the present document in that a single set of flowcharts is used to describe methods in and of themselves, along with operations of hardware and/or software. This is regardless of how each element is implemented.

Figure 6:
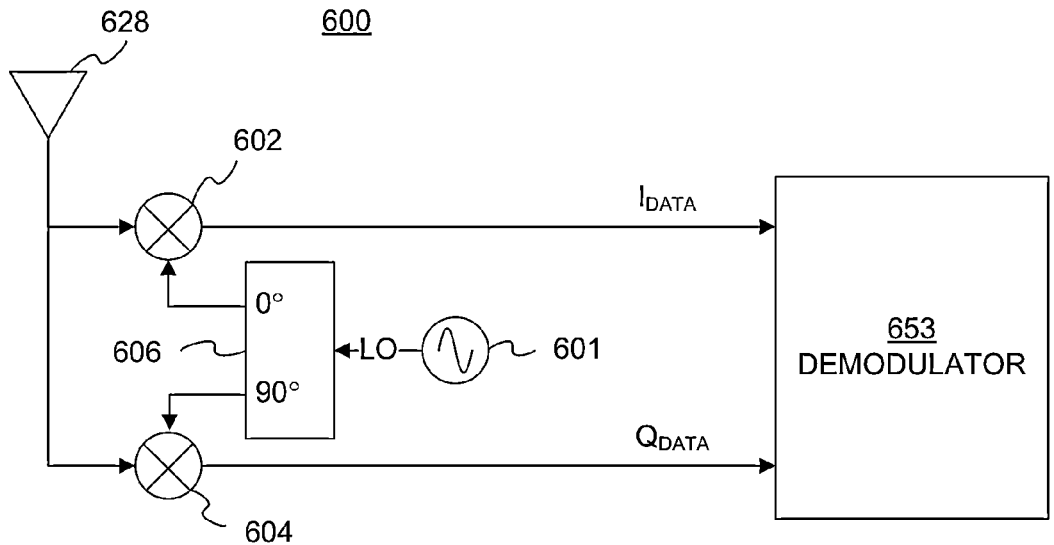
FIG. 6 is a block diagram of a receiver block of the RFID reader of FIG. 5 according to an embodiment.

FIG. 6 is a block diagram of a receiver block of the RFID reader of FIG. 5 according to an embodiment.

Receiver 600 may be a direct down-conversion receiver that directly converts a received tag response signal to a baseband signal without an intermediate step of converting to an IF signal. In some embodiments, receiver 600 may be a zero-IF receiver. In other embodiments, receiver 600 may be a low-IF receiver in which an IF signal close to zero frequency is generated. Receiver 600 comprises antenna 628, mixers 602 and 604 to convert the tag response signal directly to baseband, phase converter 606 to provide 0 deg and 90 deg phases of a local oscillator signal from the local oscillator 601 to the mixers, and demodulator 653.

In some embodiments, receiver 600 may also include one or more filters to filter undesirable mixing products and interfering signals, as well as to reduce baseband distortion and noise. Antenna 628 may comprise a directional or omnidirectional antenna, including, for example, a dipole antenna, a monopole antenna, a loop antenna, a microstrip antenna or other type of antenna suitable for reception and/or transmission of RF signals which may be processed by receiver 600. In some embodiments, antenna 628 may be a tuned antenna.

Receiver 600 may down-convert received tag response signals (RF) to an in-phase (I) channel and a quadrature-phase (Q) channel (respectively $I_{DATA}$ and $Q_{DATA}$), although the scope of the invention is not limited in this respect. In these embodiments, mixers 602 and 604 may be I-channel and Q-channel mixers used to generate I- and Q-baseband signals based on local oscillator signals. Local oscillator signals may be separated in phase by about 90 degrees.

Although receiver 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, at least portions of receiver 600 may be fabricated on a single monolithic semiconductor substrate, such as a radio-frequency integrated circuit (RFIC).

Figure 7:
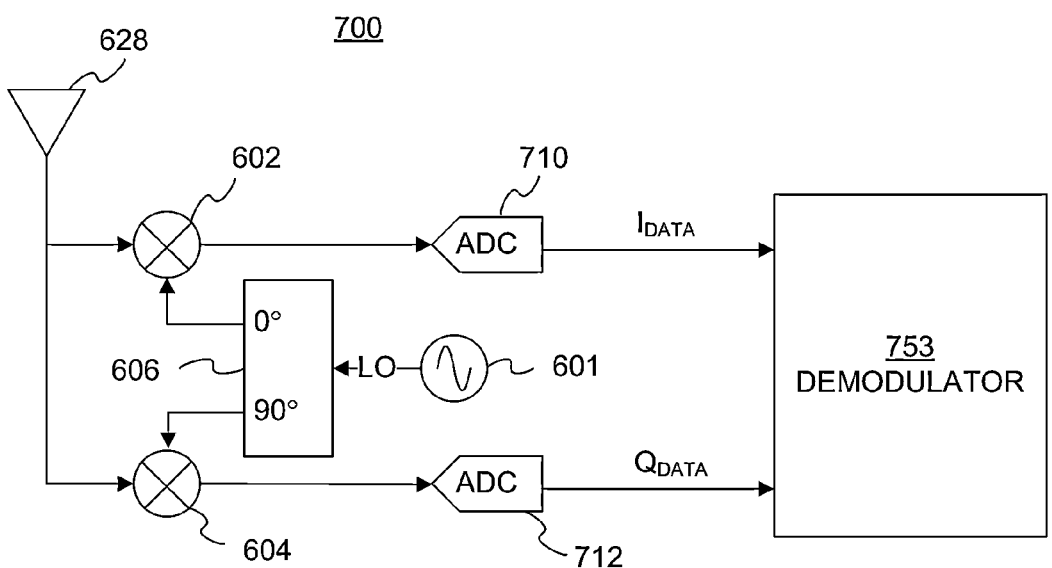
FIG. 7 is a block diagram of a receiver block of the RFID reader of FIG. 5 according to another embodiment.

FIG. 7 is a block diagram of a receiver block of the RFID reader of FIG. 5 according to another embodiment.

Similarly to receiver 600 of FIG. 6, receiver 700 includes antenna 628, mixers 602 and 604, phase converter 606, local oscillator 601, and demodulator 753. Differently from the previous receiver, however, receiver 700 includes Analog Digital Converters (ADCs) 710 and 712, which provide digital $I_{DATA}$ and $Q_{DATA}$ to demodulator 753, which is arranged to receive digital signals.

Figure 8:
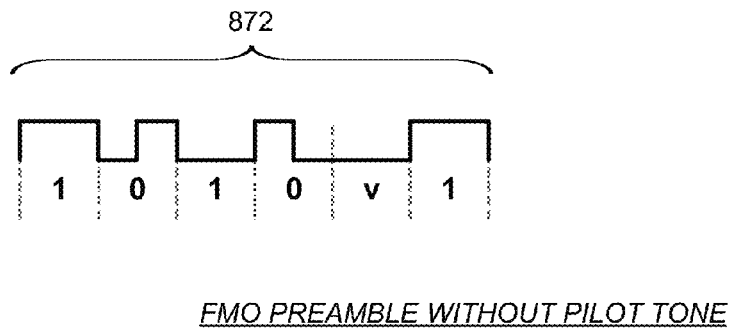
FIG. 8 shows an example of a waveform of an FM0 preamble.

FIG. 8 shows an example of a waveform of an FM0 preamble. There are two common types of RFID modulation, FM0 and Miller subcarrier. Packets sent with either modulation type include a preamble portion and a data portion, which may include payload data, security information, and the like.

FM0 is currently used in ISO standards. This modulation is fast but may be more susceptible to interference. Waveform 872 shows an FM0 preamble without a pilot tone. Tag to reader FM0 signaling begins with the preamble 872 shown in the figure. The "v" shown in the preamble indicates an FM0 violation (i.e. a phase inversion should have occurred but did not).

Figure 9:
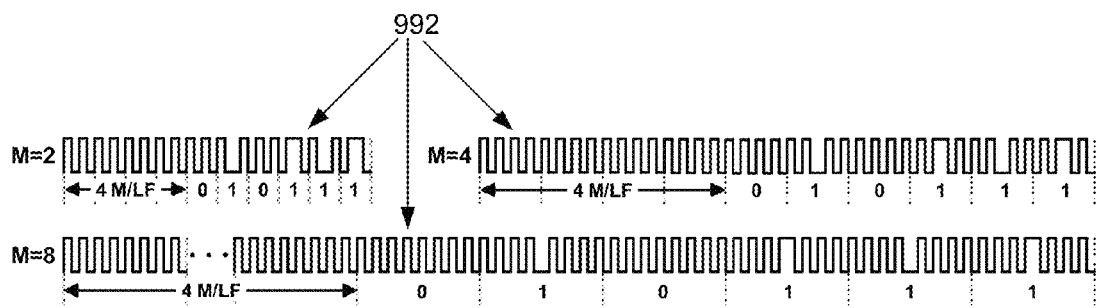
FIG. 9 shows an example of a waveform of a Miller preamble.

FIG. 9 shows an example of a waveform of a Miller preamble.

Miller Subcarrier modulation is slower but less susceptible to errors in RF noisy environments. This algorithm uses narrow spectrum for the tags to send back their signal and fits it between the channels used by the reader. That way the RF signals coming from the reader do not cover the signals coming back from the tags. Miller demodulation uses advanced filtering techniques to separate the tag's response from the reader's transmissions and other noise compared to FM0.

Miller-modulated subcarrier sequences contain exactly two, four, or eight subcarrier cycles per bit, depending on the M value specified in a Query command that initiated the inventory round (example subcarrier sequences 992).

Figure 10:
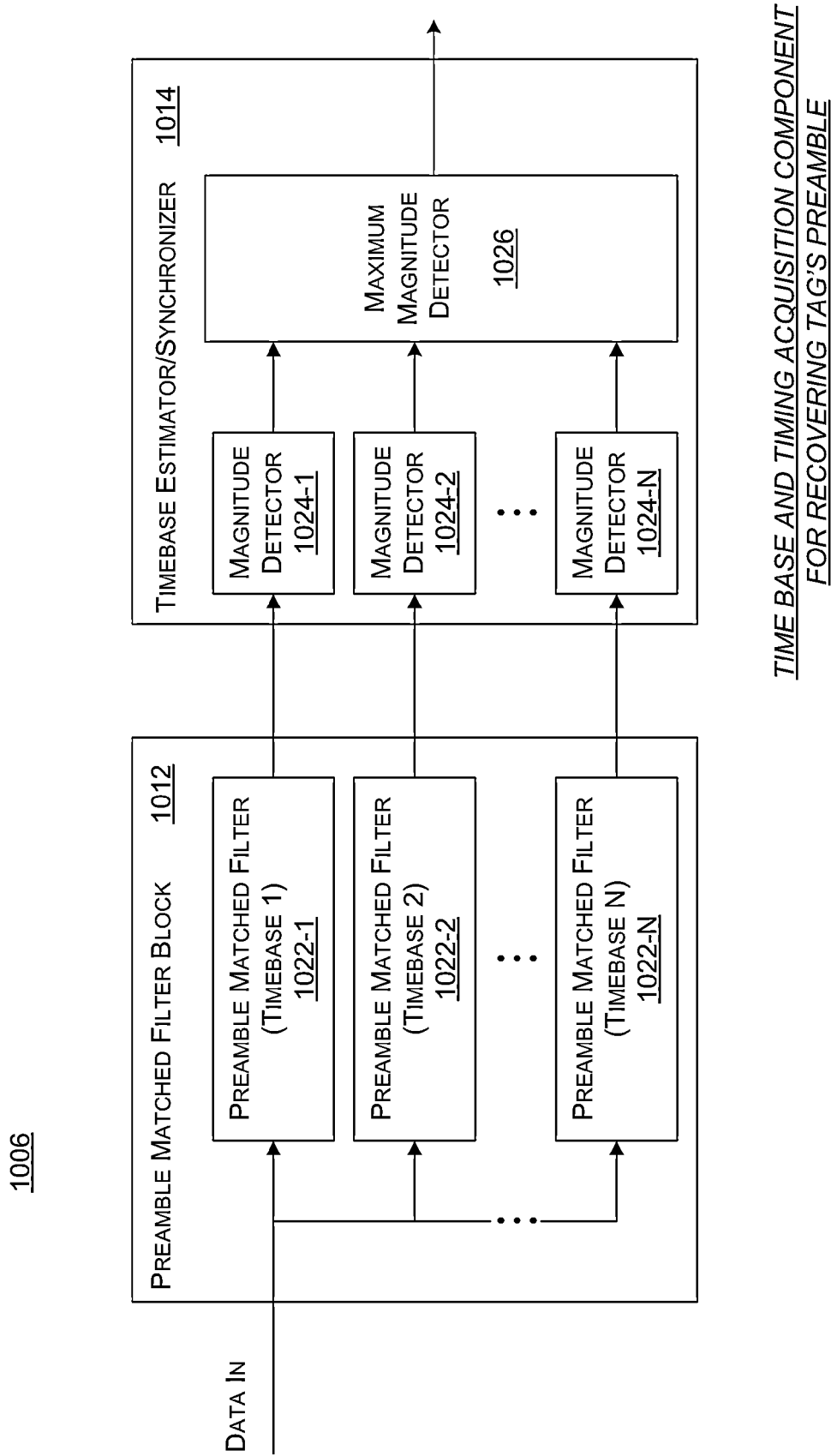
FIG. 10 is a block diagram of a different implementation of a component suitable for detecting and acquiring the waveforms of FIG. 8 and FIG. 9.

FIG. 10 is a block diagram of a different implementation of a component suitable for detecting and acquiring the waveforms of FIG. 8 and FIG. 9.

One way of detecting the tag's preamble without using a pilot tone is employing a preamble matched filter block 1012 comprising a plurality of matched filters in combination with a timebase estimator/synchronizer 1014 comprising a plurality of magnitude detectors.

In such a system, incoming data is provided to the series of preamble matched filters 1022-1 through 1022-N, each with a different timebase (timebases 1 through N). The matched filters block incoming signal except for the filter (or filters) with a close timebase. This gives a large peak when the expected preamble is filtered through the applicable filter. Each filter's output is provided to a corresponding magnitude detector 1024-1 through 1024-N.

One of the matched filter/magnitude detector combinations gives the largest peak upon detecting the tag preamble. Maximum magnitude detector 1026 of timebase estimator/synchronizer 1014 detects which magnitude detector captures the expected preamble and provides the signal from that magnitude detector to the demodulator with a known frequency, phase, and time of arrival.

In such systems, multiple matched filters operate in parallel for recovering preamble. The filters are arrayed, so that together they can cover the wide variance. The large lock range of bit tracking loop requires a large number of filters and magnitude detectors to detect the tag preamble increasing cost of manufacture, power consumption, and complexity of circuits.

Figures 11, 12:
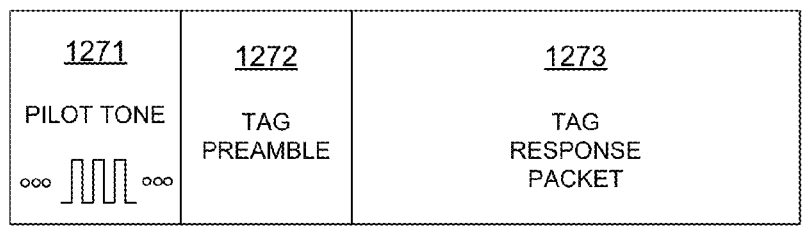
FIG. 11 is a table showing how a Query command can be constructed to cause a tag to send a pilot tone with its response.
FIG. 12 is a block diagram showing a tag response that includes the pilot tone commanded as in FIG. 11, which in turn reveals the tag's backscatter link frequency (BLF)

FIG. 11 is a table showing how a Query command can be constructed to cause a tag to send a pilot tone with its response.

In a typical tag design, the tolerance on the tag's oscillator clock can be as small as ±4% or as large as ±22%, depending on the data rate. This can be contrasted with typical wireless systems where the tolerance can be <<1%. Thus, the reader does not know when exactly the response will start being detected due to the wide variance of when the tag response can be received. Also, the reader does not know the exact length of the modulated symbols from a tag.

If nothing is done, the reader can have errors in detection such as false tag responses and missed tag responses. According to some embodiments, the tag may be commanded to generate a pilot tone in its backscatter. When the backscattered pilot tone is received in the reader, the pilot tone may be used to estimate the tag period/frequency. Then, the estimate may be used to seed and lock the few or just one symbol timing recovery loop.

Using the pilot tone to detect a frequency and phase of the tag signal allows synchronous detection of the tag preamble from an asynchronous signal with fewer correlators than any parallel implementation. Indeed, an RFID reader detection circuit using the pilot tone may be implemented with a single correlator as described in conjunction with FIG. 10 resulting in manufacturing cost savings, power consumption reduction, and the ability to reduce an integrated circuit size (such as an FPGA size) to implement the circuits. It also reduces the complexity of the reader circuits.

According to the Gen2 specification, a $TR_{ext}$ bit in a Query command may be used to enable a pilot tone preceding the tag's backscattered preamble. Other methods may also be used to command the tag to transmit the pilot tone prior to sending its data. In the Query command, $TR_{ext}=1$ chooses the tag to reader (T→R) preamble to be prepended with a pilot tone.

As shown in table 1100, an example Query command may include bits defining a DR value for singulation, a Miller subcarrier selection bit pair defining what number of cycles per symbol is to be used, a $TR_{ext}$ bit defining whether or not a pilot tone is requested, a session identifier, a cyclical redundancy check bit, and so on.

FIG. 12 is a block diagram showing a tag response that includes the pilot tone commanded as in FIG. 11, which in turn reveals the tag's backscatter link frequency (BLF).

As shown in diagram 1270, the tag response following a Query command with $TR_{ext}=1$ includes pilot tone 1271 before tag preamble 1272, which is followed by tag response packet 1273. The pilot tone is at the period (frequency) of the tag.

Figure 13:
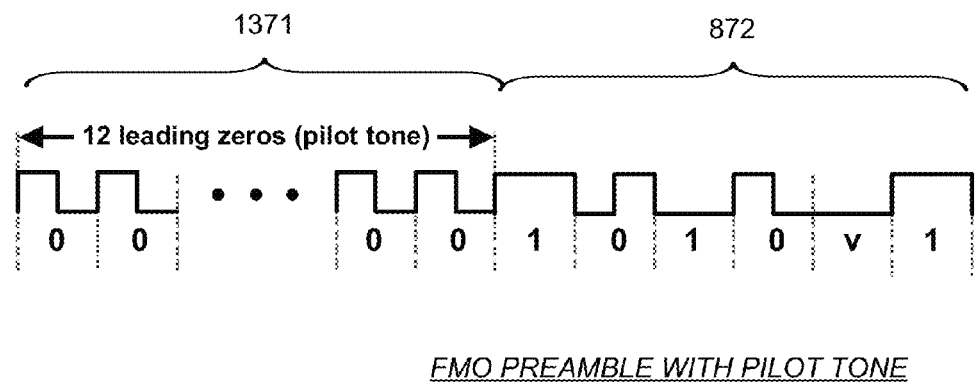
FIG. 13 shows an example of a waveform of the FM0 preamble of FIG. 8, further preceded by the pilot tone of FIG. 12.

FIG. 13 shows an example of a waveform of the FM0 preamble of FIG. 8, further preceded by the pilot tone of FIG. 12.

The FM0 preamble shown in FIG. 12 includes the same preamble as in FIG. 8 (872) prepended with 12 leading zero bits forming the pilot tone 1371. According to other specifications a "1" bit value or a different number of bits may be used as the pilot tone.

Figure 14:
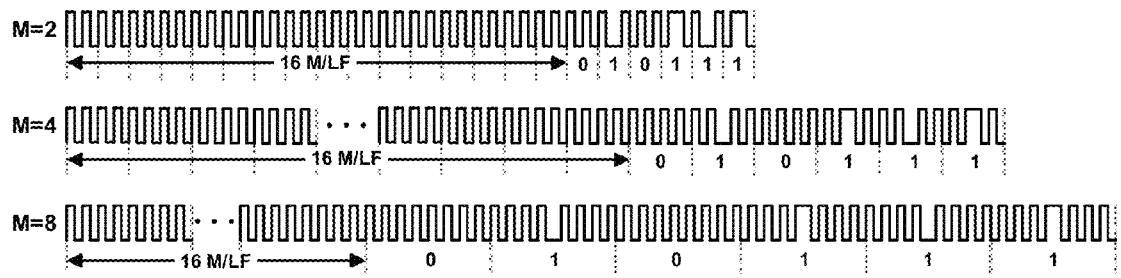
FIG. 14 shows an example of a waveform of the Miller preamble of FIG. 9, further preceded by the pilot tone of FIG. 12.

FIG. 14 shows an example of a waveform of the Miller preamble of FIG. 9, further preceded by the pilot tone of FIG. 12.

Three example Miller preambles of FIG. 9 for M=2, M=4, and M=8 are shown in FIG. 14, each prepended with 16 leading zero bits serving as the pilot tone. Similarly, other bit values or number of bits may also be chosen as pilot tone for use with Miller preambles.

Figure 15:
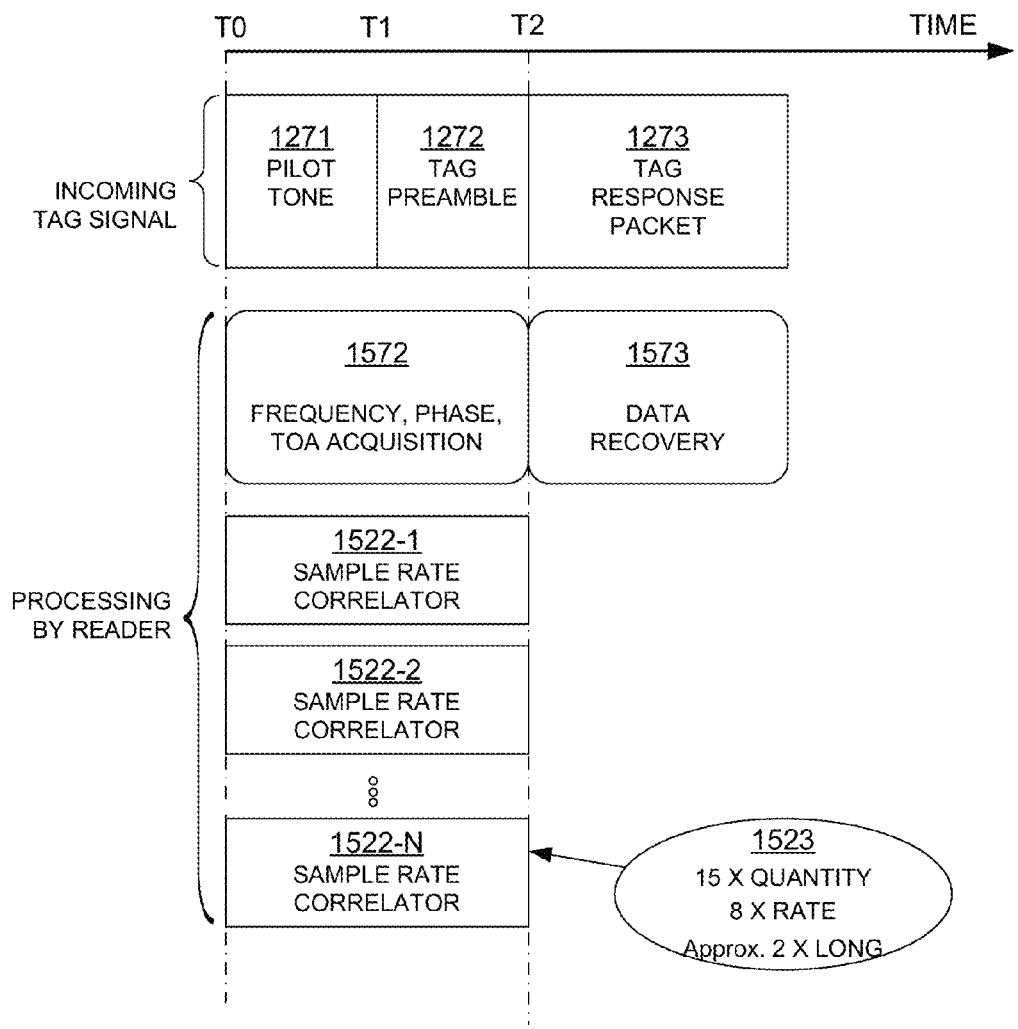
FIG. 15 is a hybrid conceptual time and block diagram, for illustrating embodiments the prior art may need to accommodate also the pilot tone of FIG. 12.

FIG. 15 is a hybrid conceptual time and block diagram, for illustrating embodiments the prior art may need to also accommodate the pilot tone of FIG. 12.

As described in FIG. 12, incoming tag signal with the pilot tone includes pilot tone 1271 between time points T0 and T1, tag preamble 1272 between T1 and T2, and tag response packet 1273 starting at T2.

Processing of the tag signal by the reader involves frequency, phase, and time of arrival acquisition (1572) from the pilot tone and tag preamble between T0 and T1. According to some embodiments, the reader may also process the preamble in one or more sample rate correlators (1522-1 through 1522-N). Normally, the correlator performs correlation with an expected preamble. This gives a large peak when the expected preamble is received, due to autocorrelation.

Figure 16:
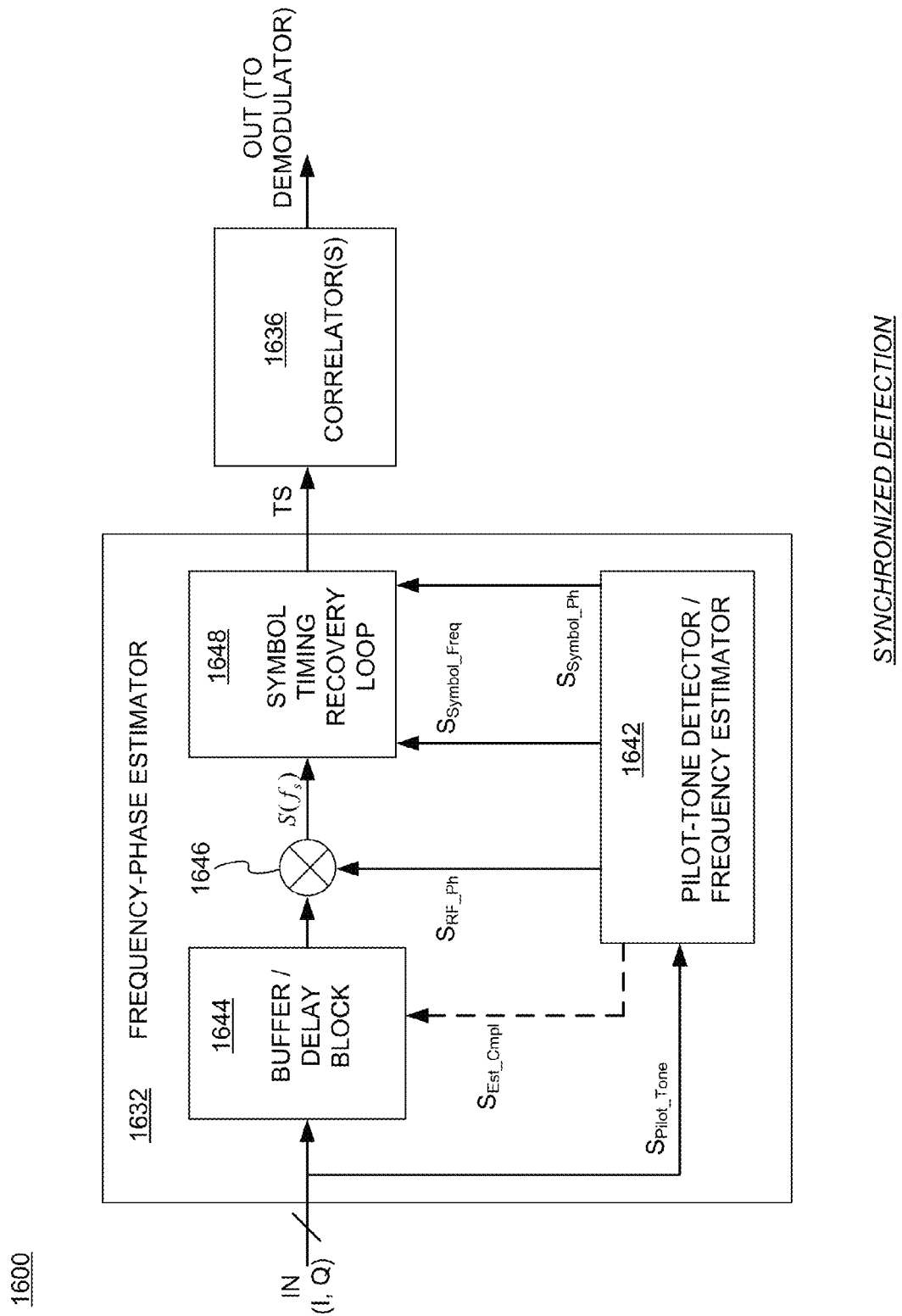
FIG. 16 is a block diagram of a signal-processing block of the RFID reader of FIG. 5 using pilot-tone detection according to embodiments.

FIG. 16 is a block diagram of a signal-processing block of the RFID reader of FIG. 5 using pilot-tone detection according to embodiments.

In a typical communication session, the RFID reader sends a command via an RF wave that encodes symbols, which define the command. Then the reader waits for some time while still transmitting RF. At the end of the silent period the tag backscatters a response, which the reader is supposed to detect and read. The backscatter includes a preamble and data associated with the command. According to some embodiments, the tag response may also include a pilot tone before the preamble, if the reader's command specified it.

Input signal IN may include combined I- and Q-channels of the tag response signal. The signal is provided to buffer/delay block 1644 for generating a delayed version of the received signal, which is provided to mixer 1646. The delay is set by the frequency estimator.

Pilot tone portion of the signal $S_{Pilot\_Tone}$ is also provided to pilot tone detector/frequency estimator 1642. The tag signal frequency is estimated using any one or combination of methods including a discrete Fourier transform (DFT), fast Fourier transform (FFT), or analog clock recovery loop prior to the impending arrival of the tag's preamble. So, a more accurate estimate of the tag's backscatter data rate can be made.

Pilot tone detector/frequency estimator 1642 provides an RF signal phase estimation ($S_{RF\_ph}$) to mixer 1646 such that the I and Q signals can be combined to form $S(f_S)$ that is provided as input to symbol timing recovery loop 1648.

A phase of the tag signal may also be estimated by the pilot tone detector 1642. The estimated frequency and/or phase ($S_{Symbol\_Freq}$ and $S_{Symbol\_Ph}$) are then provided to symbol timing recovery loop 1648 to seed the recovery operation.

Symbol timing recovery loop 1648 estimates a narrowed window for the time of arrival of the packet, and thus knows when to turn on the correlator(s) 1636. Once the frequency is established, only synchronous detection of the preamble is required. Thus, only one correlator may be sufficient for recovering the preamble.

Upon exiting the loop, and right before the correlator, the signal then is frequency locked and/or phase locked. A single correlator may thus yield the exact Time of Arrival. Correlator 1636 operates synchronously to detect the tag's preamble response and delivers the preamble to the demodulator.

The circuits described above may be implemented as analog, digital, DSP, FPGA circuitry, or any combination thereof. Furthermore, at least a portion of the functionality may be implemented as software in dedicated or generic hardware. The described recovery techniques may be used in both baseband and subcarrier modes.

Figure 17:
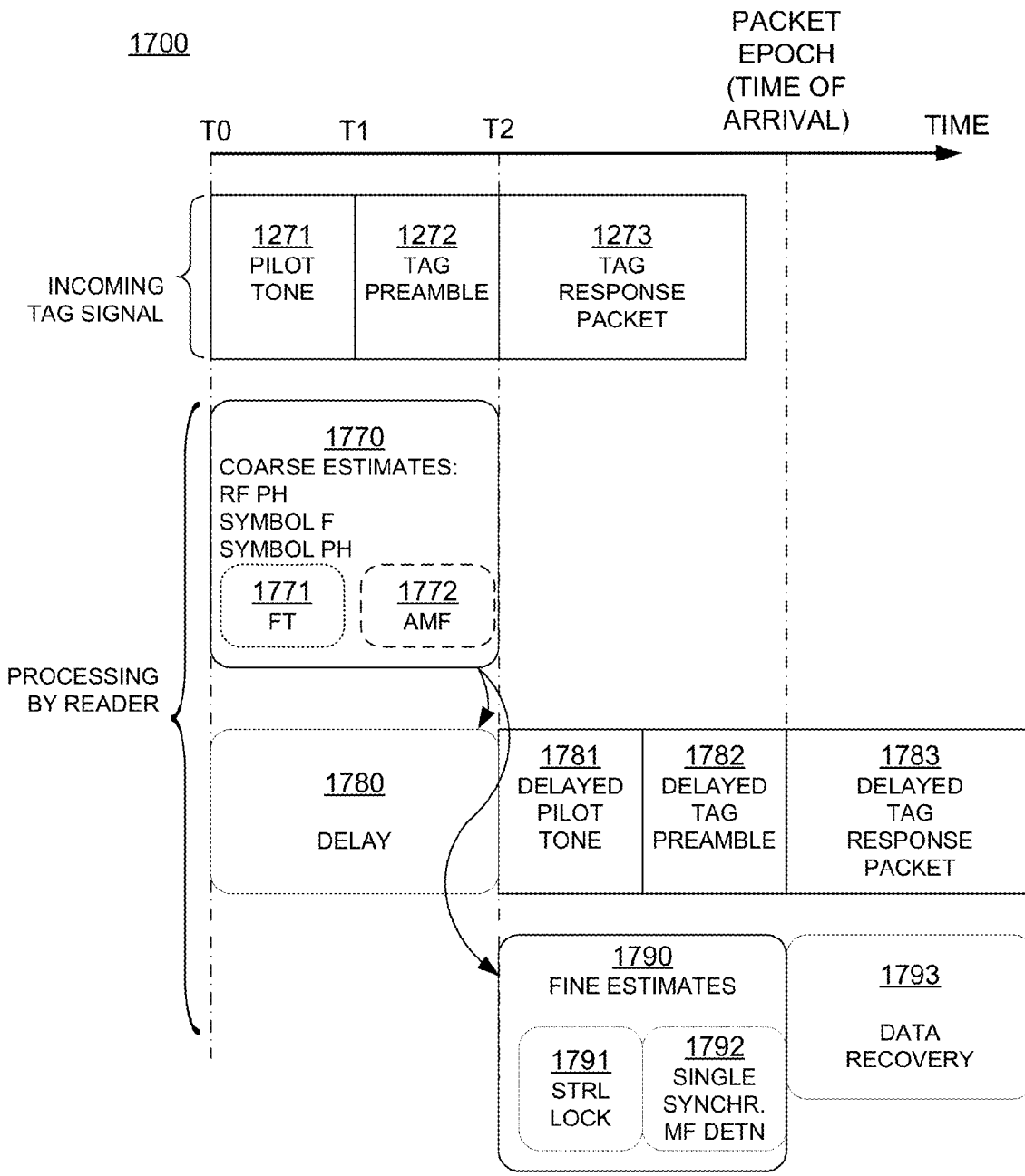
FIG. 17 is a hybrid conceptual time and operation diagram, for illustrating operations according to embodiments.

FIG. 17 is a hybrid conceptual time and operation diagram, for illustrating operations according to embodiments.

In diagram 1700, the main portions of the incoming signal (pilot tone 1271, tag preamble 1272, and tag response packet 1273) are shown against a timeline. Between T0 and T1 that cover the arrival of pilot tone 1271 and tag preamble 1272, the reader may perform coarse estimates for RF phase, symbol frequency, and symbol phase (1770) using Fourier transform (FT 1771) and/or asynchronous matched filtering (1772). Because this process may take some time to perform, a delay (1780) may be introduced to the incoming tag signal (e.g. by a variable buffer/delay block of the reader) resulting in the delayed pilot tone 1781, delayed tag preamble 1782, and delayed tag response packet 1783.

Thus, the new packet epoch (time of arrival) gets shifted to the beginning point of delayed tag response packet 1783. Following delay 1780, the reader may perform fine estimates on the received signal (1790) employing symbol time recovery loop (1791) and single synchronized matched filter (1792). Following fine estimates 1790, data recovery operations (1793) may be performed on the delayed tag response packet by the demodulator.

Figure 18:
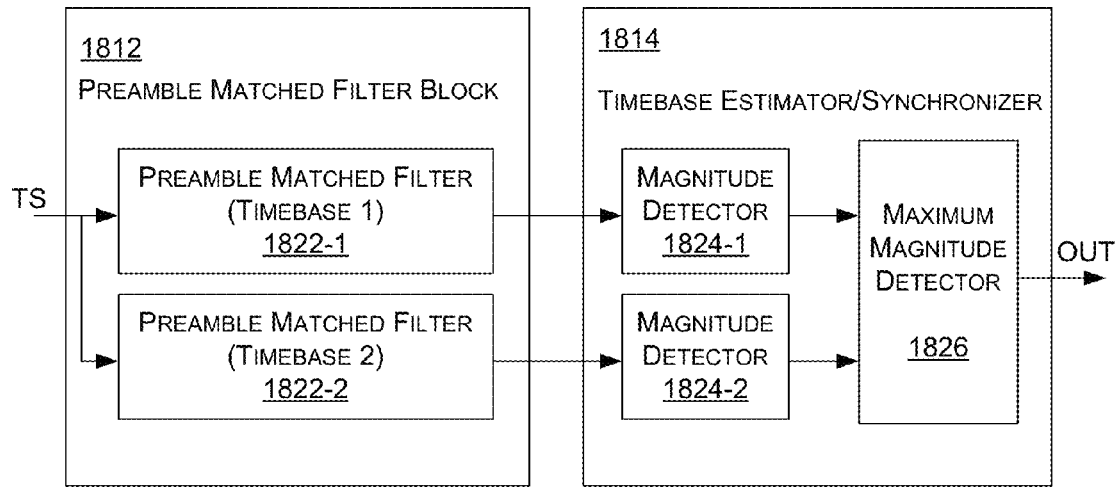
FIG. 18 is a block diagram of a correlators block of the diagram of FIG. 16 according to an embodiment.

FIG. 18 is a block diagram of a correlators block of the diagram of FIG. 16 according to an embodiment.

By using frequency and phase estimates to seed and lock the symbol time recovery loop, the detection circuit of the reader can zoom in on an expected tag preamble within the relatively large range of possibilities. Therefore, a number of correlators for detecting the preamble can be substantially reduced. Correlator block 1836 is such an example using only two matched filter/magnitude detector sets.

As described previously in conjunction with FIG. 10, preamble matched filters 1822-1 and 1822-2 derived from different timebases 1 and 2 receive signal TS and provide a signal to corresponding magnitude detectors 1824-1 and 1824-2 in timebase estimator/synchronizer block 1814. During an operation, one of the two sets captures the incoming tag preamble and provides a larger magnitude signal to maximum magnitude detector 1826, which in turn forwards the detected preamble information to the demodulator.

Figure 19:
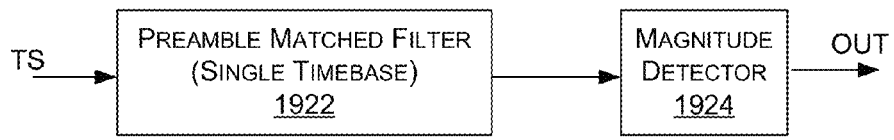
FIG. 19 is a block diagram of a correlators block of the diagram of FIG. 16 according to its preferred embodiment.

FIG. 19 is a block diagram of a correlators block of the diagram of FIG. 16 according to its preferred embodiment.

As mentioned previously, due to the lock in on the expected preamble using the pilot tone detection, correlator block 1936 may be implemented in a preferred embodiment with only a single set of matched filter/magnitude detector set.

Since the frequency and phase information associated with the preamble is already determined by the symbol time recovery loop, preamble matched filter 1922 may be used with a single timebase followed by magnitude detector 1924. Because a single set of matched filter/magnitude detector is used, no maximum magnitude detector is needed. The detected preamble information is forwarded to the demodulator directly by the magnitude detector 1924.

Figure 20:
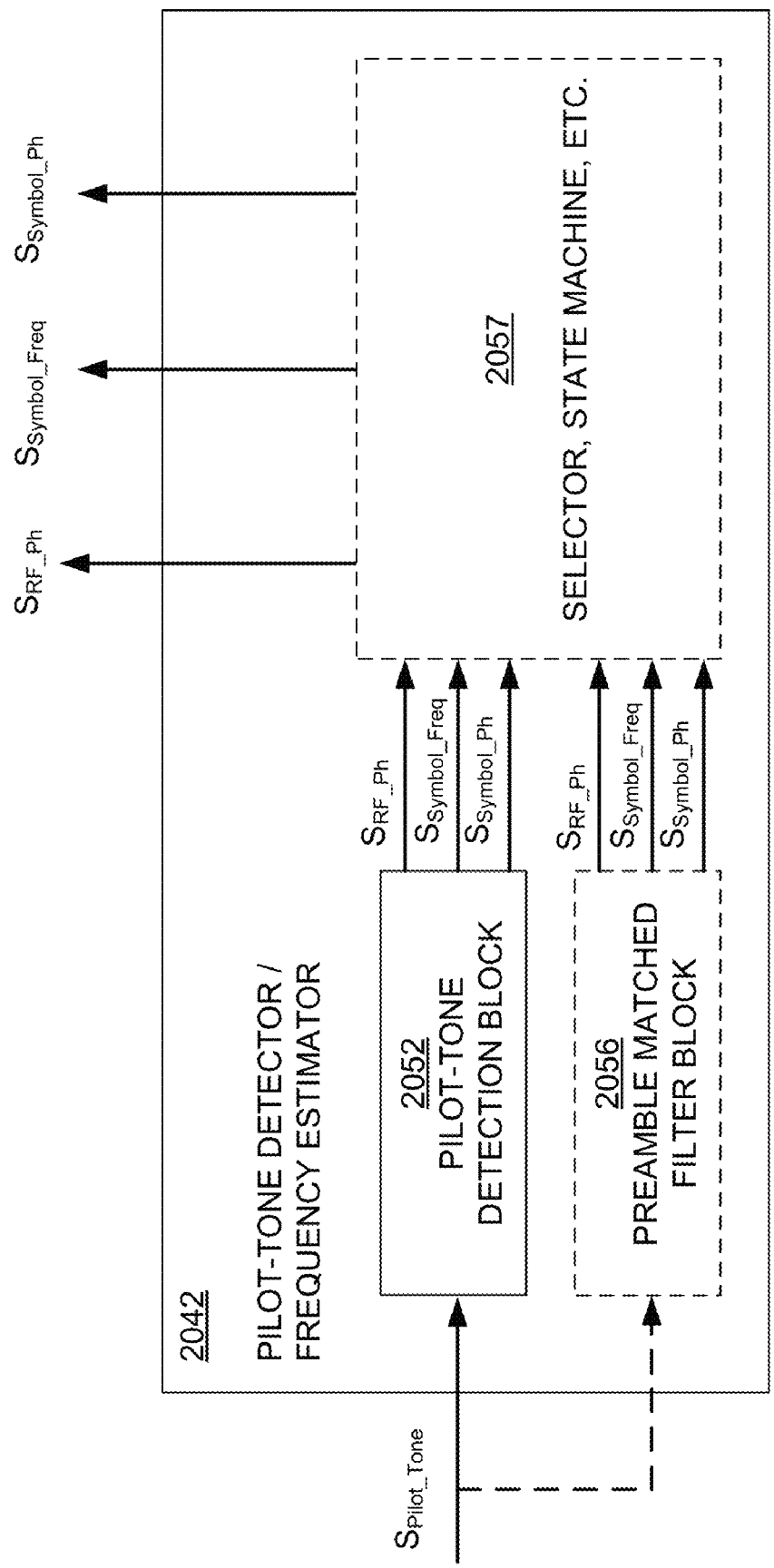
FIG. 20 is a block diagram of a Pilot Tone Detector/Frequency Estimator of the diagram of FIG. 16 according to an embodiment.

FIG. 20 is a block diagram of a pilot tone detector/frequency estimator of the diagram of FIG. 16 according to an embodiment.

Pilot tone detector/frequency estimator 2042 includes pilot tone detection block 2052, which is arranged to receive the pilot tone and provide RF phase, symbol phase, and symbol frequency estimate signals $S_{RF\_Ph}$, $S_{Symbol\_Ph}$, and $S_{Symbol\_Freq}$.

According to some embodiments, pilot tone detector/frequency estimator 2042 may include an optional preamble matched filter block that is arranged to perform the same function employing matched filters instead of the pilot tone detector/frequency estimator and provide estimate signals $S_{RF\_Ph}$, $S_{Symbol\_Ph}$, and $S_{Symbol\_Freq}$. The pilot tone detection block may be used for coarse estimates, while the preamble matched filter block is used for fine estimates.

Estimate signals $S_{RF\_Ph}$, $S_{Symbol\_Ph}$, and $S_{Symbol\_Freq}$ from either block (or both) may be provided to a selection block 2057 such as a selector, a state machine, and the like. The selection block 2057 may provide individual estimate signals $S_{RF\_Ph}$, $S_{Symbol\_Ph}$, and $S_{Symbol\_Freq}$ to other circuits such as correlators.

Figure 21:
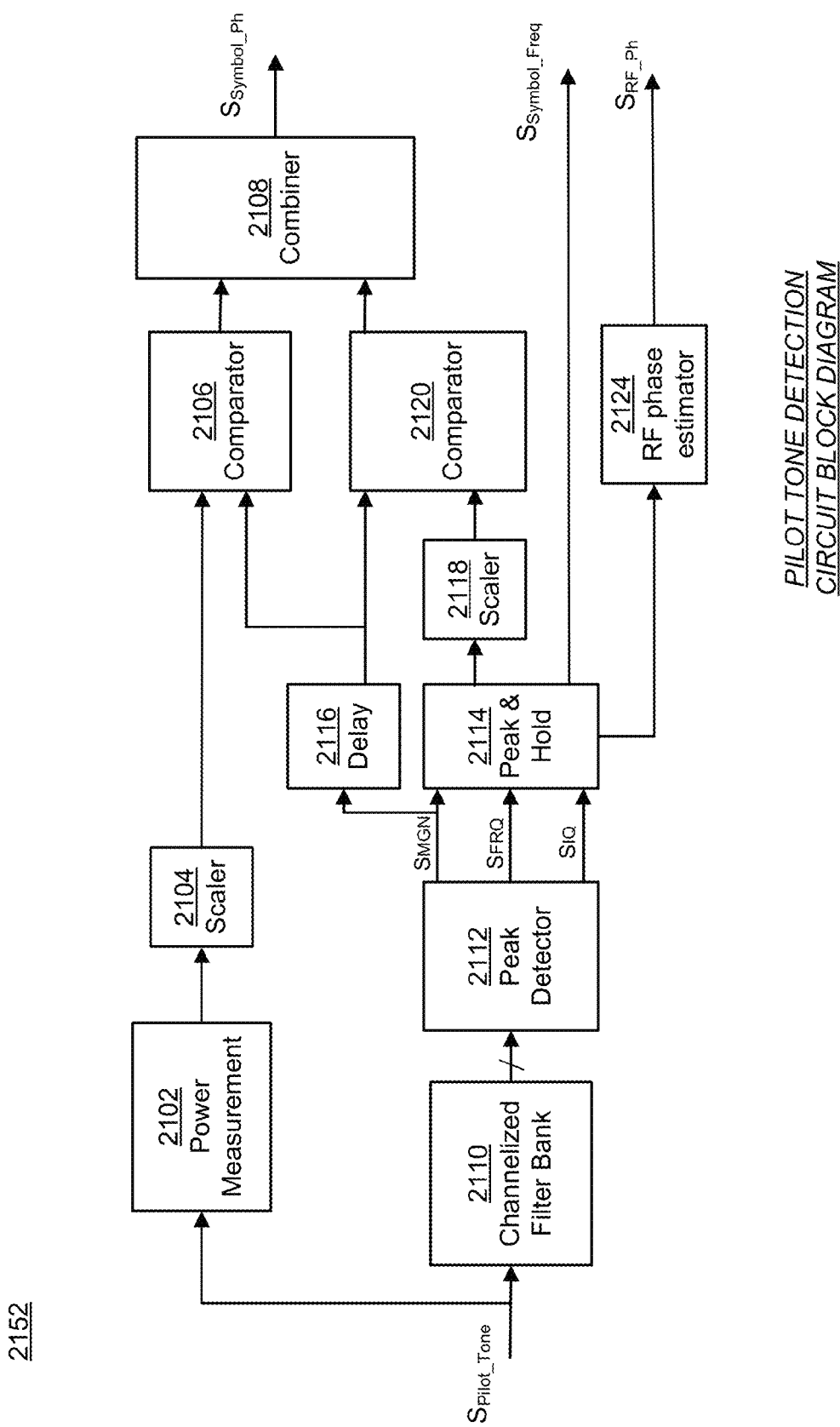
FIG. 21 is a more detailed diagram of a pilot tone detection circuit of FIG. 20 according to an embodiment.

FIG. 21 is a more detailed diagram of a pilot tone detection circuit of FIG. 20 according to an embodiment.

Circuit 2152 includes a channelized filter bank 2110 which receives the incoming signal, divides into spectral components, and provides to peak detector 2112. The received signal $S_{Pilot\_Tone}$ is also provided to power measurement block 2102. The measured power is scaled by scaler 2104 and provided to comparator 2106.

A delayed version of the detected peak of the filtered input signal $S_{Pilot\_Tone}$ is provided by delay block 2116 to comparators 2106 and 2120. A peak and hold block 2114 receives the detected peaks of the filtered input signals $S_{FRQ}$ and $S_{IQ}$ from peak detector 2112 providing an input to scaler 2118 as well as a frequency estimate output $S_{Symbol\_Freq}$ and an input to RF phase estimator 2124 for phase estimation.

An output of scaler 2118 is provided to comparator 2120 for comparison with the delayed version of the signal from delay block 2116. Both comparator (2106 and 2120) outputs are then combined at combiner 2108 to provide a signal for symbol phase $S_{Symbol\_Ph}$. The estimate signals, $S_{Symbol\_Freq}$ and $S_{Symbol\_Ph}$ may be used to seed and lock the few or just one symbol timing recovery loop.

According to some embodiments, a method for an RFID reader system may include receiving from an RFID tag a backscattered signal, detecting the pilot tone, estimating a frequency of the pilot tone in the backscattered signal, recovering a timing of symbols in the backscattered signal using the estimated frequency, demodulating the backscattered signal based on the symbol timing to recover data. The signal may be backscattered from the RFID tag responsive to a command transmitted by the reader, where the pilot tone is detected only if the command belongs in a subset of commands.

The pilot tone may be detected by generating a baseline version of the backscattered signal, generating a version of the backscattered signal that is delayed with respect to the backscattered signal, and establishing detection when the delayed version reaches a detection relationship with the baseline version. The detection relationship may be that the delayed version exceeds the baseline version.

Moreover, the baseline version of the tag signal may be generated as a preset portion of a magnitude of the tag signal. The preset portion may be substantially equal to 50%. According to other embodiments, the baseline version may have a waveform that rises up to a cusp, and then continues at substantially the same value, and the delayed version may be delayed enough so that detection is established after the cusp. Detection may be established only if both the delayed version and the baseline version exceed a detection threshold. Furthermore, the detection threshold may be defined in terms of detected ambient noise and may be updated.

According to further embodiments, the backscattered signal may be received responsive to a command signal transmitted by the RFID reader system, the command signal may cause the tag to be silent during a silent period, and the detection threshold is defined from a power measurement made during the silent period.

The frequency of the tag signal may be estimated by employing a Discrete Fourier Transform (DFT) or Fast Fourier Transform (FFT) of the received pilot tone. The frequency may also be estimated by correlating the backscattered tag signal with an expected version of the backscattered signal.

The method according to embodiments may further include identifying in the backscattered signal a preamble using the symbol timing where the backscattered signal is demodulated based on a timing of the preamble, and determining from the preamble timing a Time Of Arrival (TOA) for a remainder of the backscattered signal where the data is recovered from the remainder. The preamble may be identified using a single correlator.

In yet further embodiments, the method may include delaying the remainder of the backscattered signal the preamble by a delay time and adjusting the delay time to compensate for an amount of time taken to estimate the frequency.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Some of the methods are now described more particularly according to embodiments.

Figure 22:
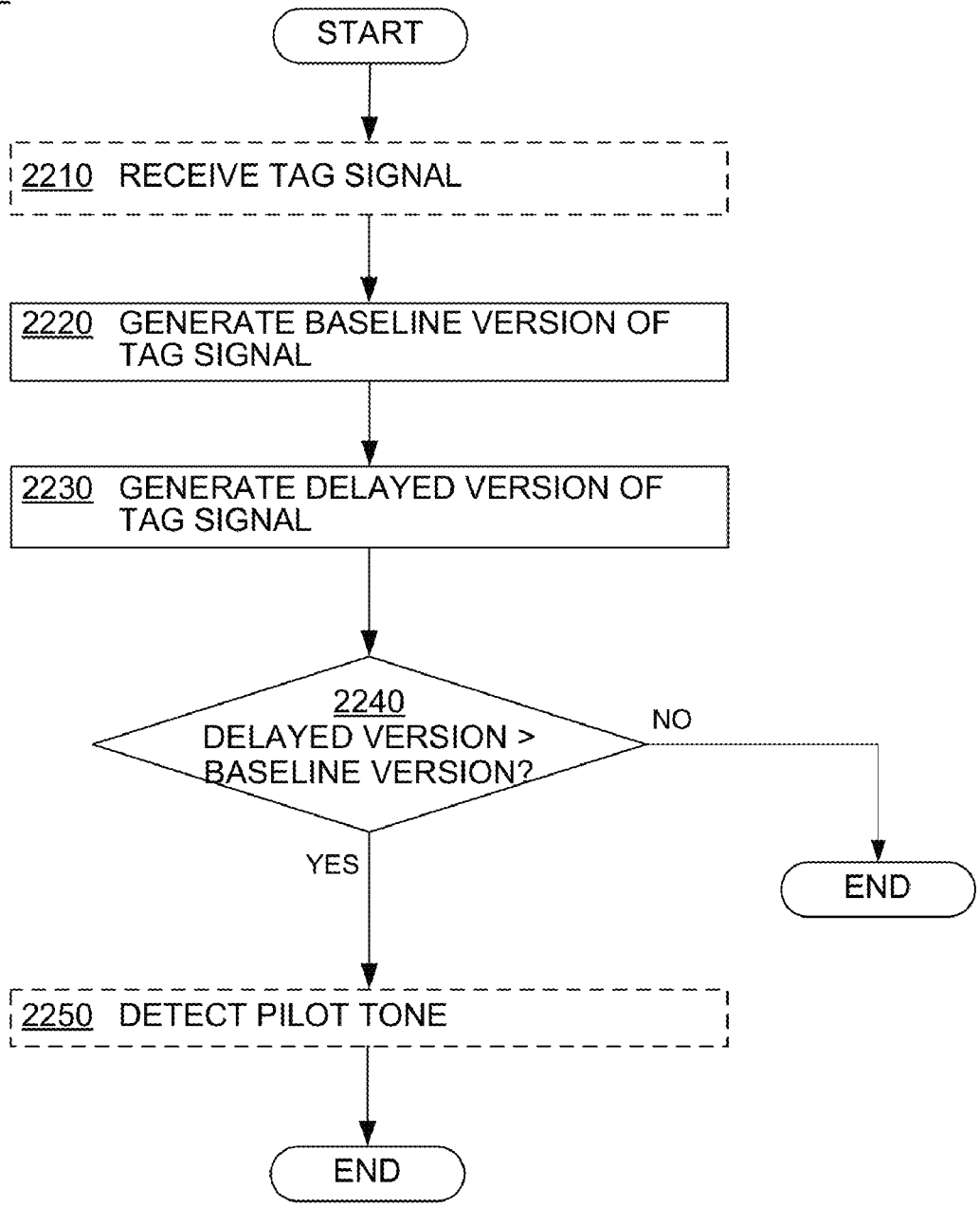
FIG. 22 is a flowchart of a process for detecting a pilot tone according to embodiments.

FIG. 22 is a flowchart of a process for detecting a pilot tone according to embodiments.

Process 2200 begins at optional operation 2210, where the tag signal is received. As mentioned previously, tag signal includes a frequency and a phase that is typically not synchronous with a frequency and phase of the reader clock.

According to next operation 2220, a baseline version of the tag signal is generated as described above in conjunction with FIG. 21.

According to a next operation 2230, a delayed version of the tag signal is generated.

According to a next decision operation 2240, a determination is made whether the delayed version of the tag signal is larger than the baseline version. If the baseline version is larger, no pilot tone has been detected, and processing returns to a calling process for further operations.

If the delayed version of the tag signal is larger than the baseline version, processing continues from decision operation 2240 to optional operation 2250, where the pilot tone is detected and operations associated with adjusting a frequency and phase of the reader clock signal may be performed.

The operations included in process 2200 are for illustration purposes. Pilot tone detection in an RFID reader by comparing a delayed version of the tag signal with a baseline version may be implemented by similar processes with fewer or additional steps, as well as in different order of operations using the principles described herein.

Figure 23A:
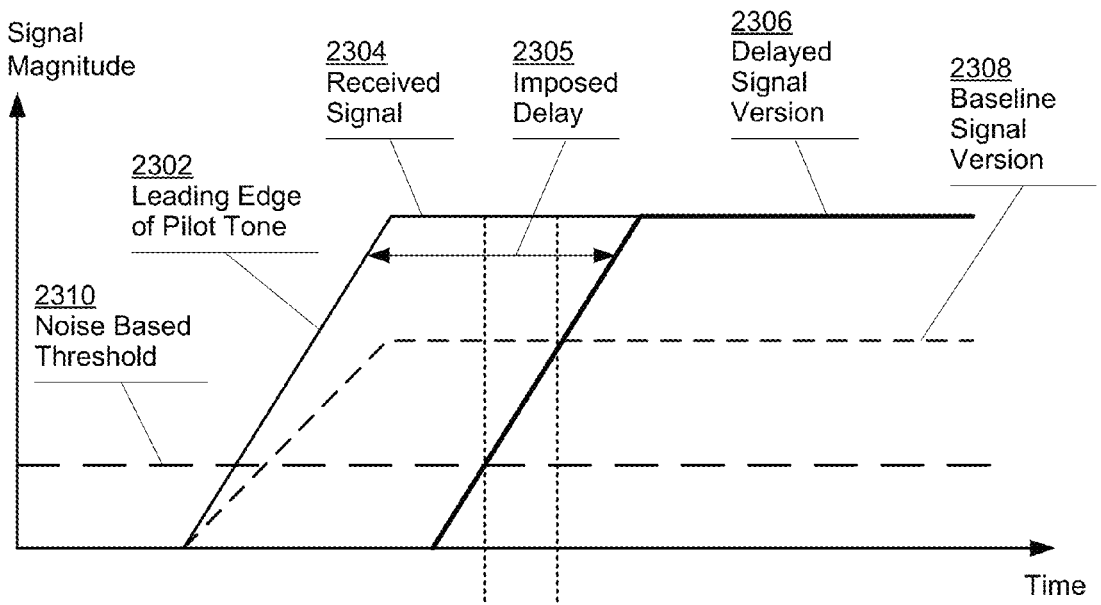
FIG. 23A shows waveforms of signals according to an embodiment of the method of FIG. 22.

FIG. 23A shows waveforms of signals according to an embodiment of the method of FIG. 22.

According to some embodiments, a pilot tone transmitted by the tag for providing the reader with information about its response frequency and phase may be detected by the reader employing two separate criteria. A first criterion may include detection based on a comparison of the pilot tone with a noise-based threshold (2310) as shown in diagram 2300.

The noise-based threshold is set in response to a measurement performed at a time point before the tag response is expected. The measurement may be a power measurement and the power estimate scaled to set a desired False Alarm Rate (FAR) and a detection probability. Since the threshold is based on an actual measurement, it adapts to a dynamic RFID environment, which may include interference noise, different tag power levels, and so on.

Once the first detection occurs, an auto-normalized baseline version of the tag signal 2308 may be established based on the signal magnitude. The threshold may be peak-held and scaled. A delayed signal version (2306) may also be derived from the received signal (2304) by imposing a preset delay 2305. A leading edge of the received pilot tone 2302 increases with the same gradient as the delayed version.

The delayed version 2306 is then compared to the signal-based threshold (baseline version) 2308 to detect the pilot tone with an accurate time of arrival estimate.

Figure 23B:
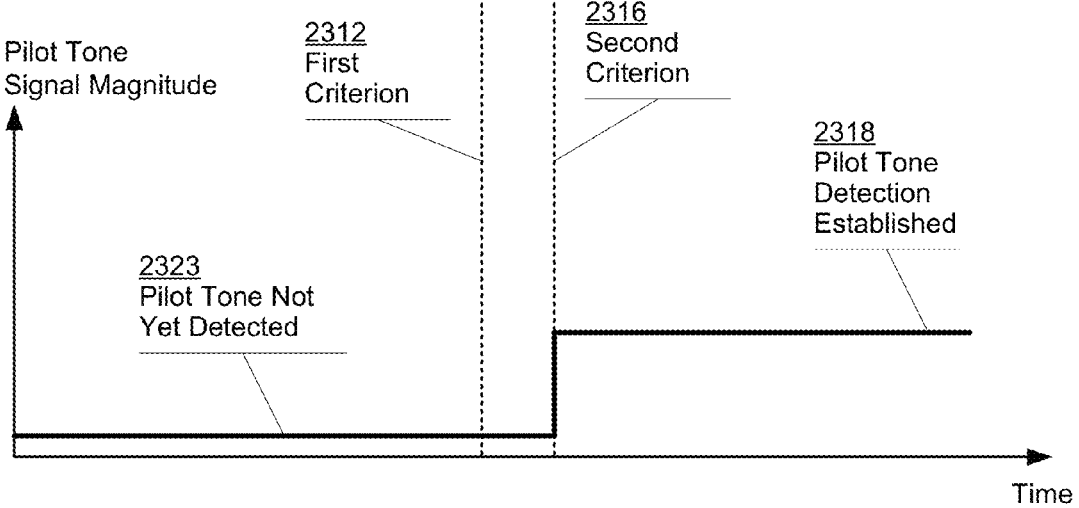
FIG. 23B shows how the waveforms of FIG. 23A can be used to establish detection.

FIG. 23B shows how the waveforms of FIG. 23A can be used to establish detection.

Diagram 2350 shows pilot tone magnitude over time. Initially the pilot tone is not detected (2323). The first criterion 2312 (noise-based threshold) initiates the implementation of the second criterion 2316 (signal-based threshold). If both are satisfied, pilot tone detection is established (2318).

The waveforms and circuits described above illustrate an example embodiment for using comparison between a baseline version and a delayed version of tag signal for tag pilot tone detection. Other circuits and waveforms may also be used without departing from a scope and spirit of the invention.

Figure 24:
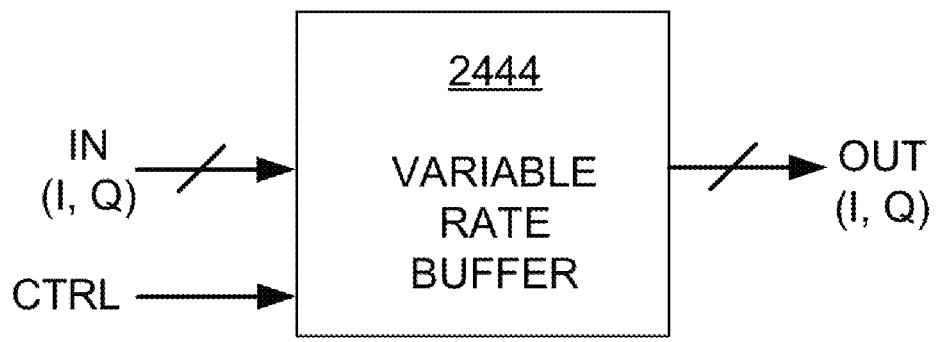
FIG. 24 is a block diagram of a buffer/delay block of the diagram of FIG. 16 according to an embodiment.

FIG. 24 is a block diagram of a buffer/delay block of the diagram of FIG. 16 according to an embodiment.

As described previously in conjunction with FIG. 16, the I and Q channels of the detected tag response signal may be provided by the receiver block to a buffer/delay block of a frequency and/or phase estimator circuit of the reader. The buffer/delay block may include in one embodiment, a variable rate buffer 2444.

A rate of the variable rate buffer 2444 may be controlled by a feedback signal from frequency estimator to compensate for the time it takes to estimate the frequency. Variable rate buffer 2444 then provides the buffered tag response signal to a mixer for the symbol timing recovery loop.

Figure 25:
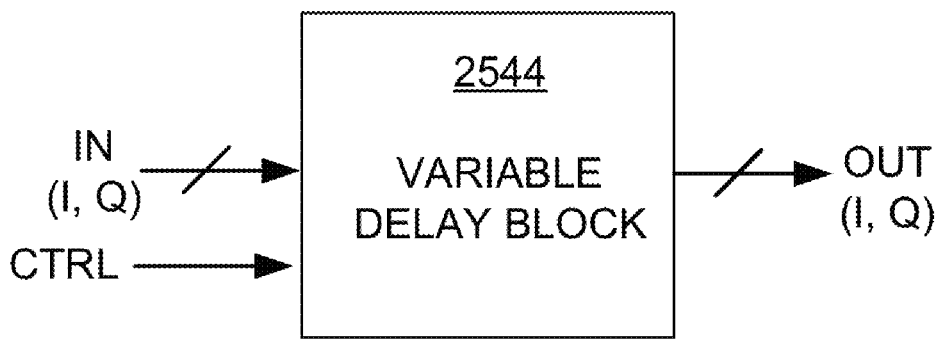
FIG. 25 is a block diagram of a buffer/delay block of the diagram of FIG. 16 according to an embodiment.

FIG. 25 is a block diagram of a buffer/delay block of the diagram of FIG. 16 according to an embodiment.

In another embodiment, a variable delay block 2544 may be used to receive the I- and Q-channels of the detected tag response signal and generate a delayed version based on the estimation control signal from the frequency estimator.

FIG. 26 is a block diagram of a symbol timing recovery loop block of the diagram of FIG. 16 according to an embodiment.

Symbol timing recovery loop block 2648 includes data matched filter 2650 for receiving signal $S(f_S)$ from a mixer that mixes an RF estimated signal and a delayed (or buffered) version of the tag response signal. Data matched filter 2650 provides filtered signal to digital rate converter 2640, which in turn provides a derived tag response signal (recovered signal) TS to other circuits such as one or more correlators of the reader. Digital rate converter also provides the recovered signal to the symbol timing recovery loop comprising (in addition to the digital rate converter) timing error detector 2660, loop filter 2670, and numerically controlled oscillator (NCO) 2680.

A phase detector part of the feedback loop comprising the timing error detector 2660 and the loop filter 2670 enables digital rate converter 2680 to perform conversion that peaks (corresponding to correct timing) of the derived signal correspond to the peaks of the actual tag signal and can be provided to other digital circuitry within the reader as output.

NCO 2680 also receives an estimated frequency input $S_{Symbol\_Freq}$ from frequency estimator and provides feedback phase estimation $S_{Symbol\_Ph}$ to digital rate converter 2640 for adjusting the sample the interpolation and decimation such that the digital rate converter output samples are phase and frequency synchronous with the received tag signal.

In such a system, timing recovery circuits may be implemented fully in digital domain, and there is no need for an analog PLL or Nth order non-linearity. Furthermore, ADC clock is allowed to be a single fixed frequency clock unrelated to the received signal frequency. ADC, digital processing, and back-end interfaces may all operate from a single fixed clock. Thus, there is no need for adjusting ADC sample clock frequency and phase based on the received signal. The data matched filter may operate synchronous to the received signal providing optimal performance.

FIG. 27 is a block diagram of a symbol timing recovery loop block of the diagram of FIG. 16 according to other embodiments.

Similar to the block diagram of FIG. 26, symbol timing recovery loop block 2748 includes digital rate converter 2740, which provides a derived tag response signal (recovered signal) to data matched filter 2750 which in turn provide output signal TS to other circuits such as one or more correlators of the reader. Data matched filter 2750 also provides the recovered signal to the symbol timing recovery loop comprising timing error detector 2760, loop filter 2770, and numerically controlled oscillator (NCO) 2780.

Differently from the symbol timing recovery loop block 2648, data matched filter 2750 is within the timing loop between digital rate converter 2740 and timing error detector 2760 in the symbol timing recovery loop block 2748 of FIG. 27. In other embodiments, the symbol timing recovery loop block may be implemented without using a data matched filter at all.

Figure 28:
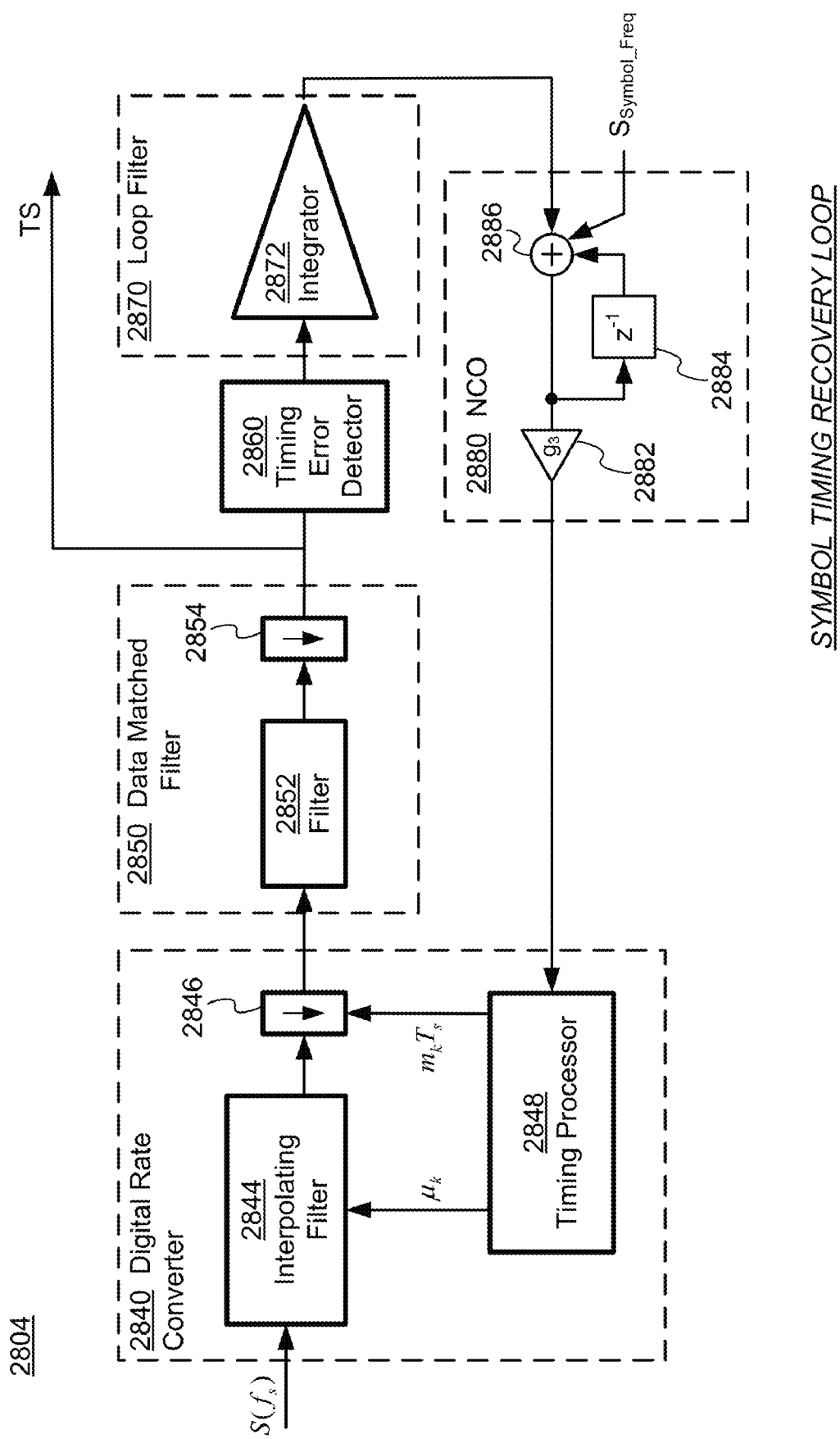
FIG. 28 is a more detailed block diagram for implementing the symbol timing recovery loop block of the diagram of FIG. 27 according to embodiments.

FIG. 28 is a more detailed block diagram 2804 for implementing the symbol timing recovery loop block of the diagram of FIG. 27 according to embodiments.

Digital rate converter 2840 may derive the recovered signal employing various conversion approaches. According to one embodiment, digital rate converter 2840 may perform conversion based on time variant fractional adjustment.

Digital rate converter 2840 may perform interpolation across an N point sample set followed by variable rate decimation and generate derived samples in response to receiving ADC samples of the tag response signal by fractional delay processing of these samples.

Digital rate converter 2840 may include interpolating filter 2844, decimator 2846, and timing processor 2848. Interpolating filter 2844 receives ADC samples S(f$_s$) with a frequency f$_S$=1/T$_S$ and performs the interpolation. The interpolation may be an exponential interpolation, Lagrange interpolation, and the like. Interpolating filter 2844 also receives an input from timing processor 2848 that includes time variant fractional delay coefficient μ$_k$ for adjusting sample peaks.

Decimator 2846 decimates an output of interpolating filter 2844 based on a control signal from timing processor 2848, which in turn receives feedback from the NCO of the timing loop. Thus, the rate converter decimates the interpolated data samples, with the dynamic decimation rate changing with time, to produce an output frequency synchronous with the received symbol rate.

Data matched filter 2850 may be implemented using filter 2850 and decimator 2854. An output of decimator 2854 is the recovered tag response signal TS.

In a simple implementation, loop filter 2870 may include an integrator 2872 that receives and output of the phase detector and provides a control signal to the NCO of the timing recovery circuit. The loop filter may include phase lead-lag compensation and be of any order.

An NCO is a digital system that synthesizes a range of frequencies through the accumulation of discrete input phase increments. The output frequency range is controlled by the size of the input phase increment and the fixed NCO clock frequency.

The NCO can also be implemented in a number of ways. One example embodiment of NCO 2880 includes combiner 2886, which receives an output of the loop filter, a symbol frequency estimation signal S$_{Symbol\_Freq}$, and a feedback signal from digital feedback register 2884. The combiner's output is provided to amplifier 2882 with a preset gain g3. The NCO's output is provided to the timing processor of the digital rate converter such that it can control a decimator for decimating selected samples and outputting those that correspond to received sample values synchronous with the received tag signal.

The circuits described above illustrate an example embodiment for using pilot tone based timing recovery from tag signals. Other circuits may also be used without departing from a scope and spirit of the invention.

Figure 29:
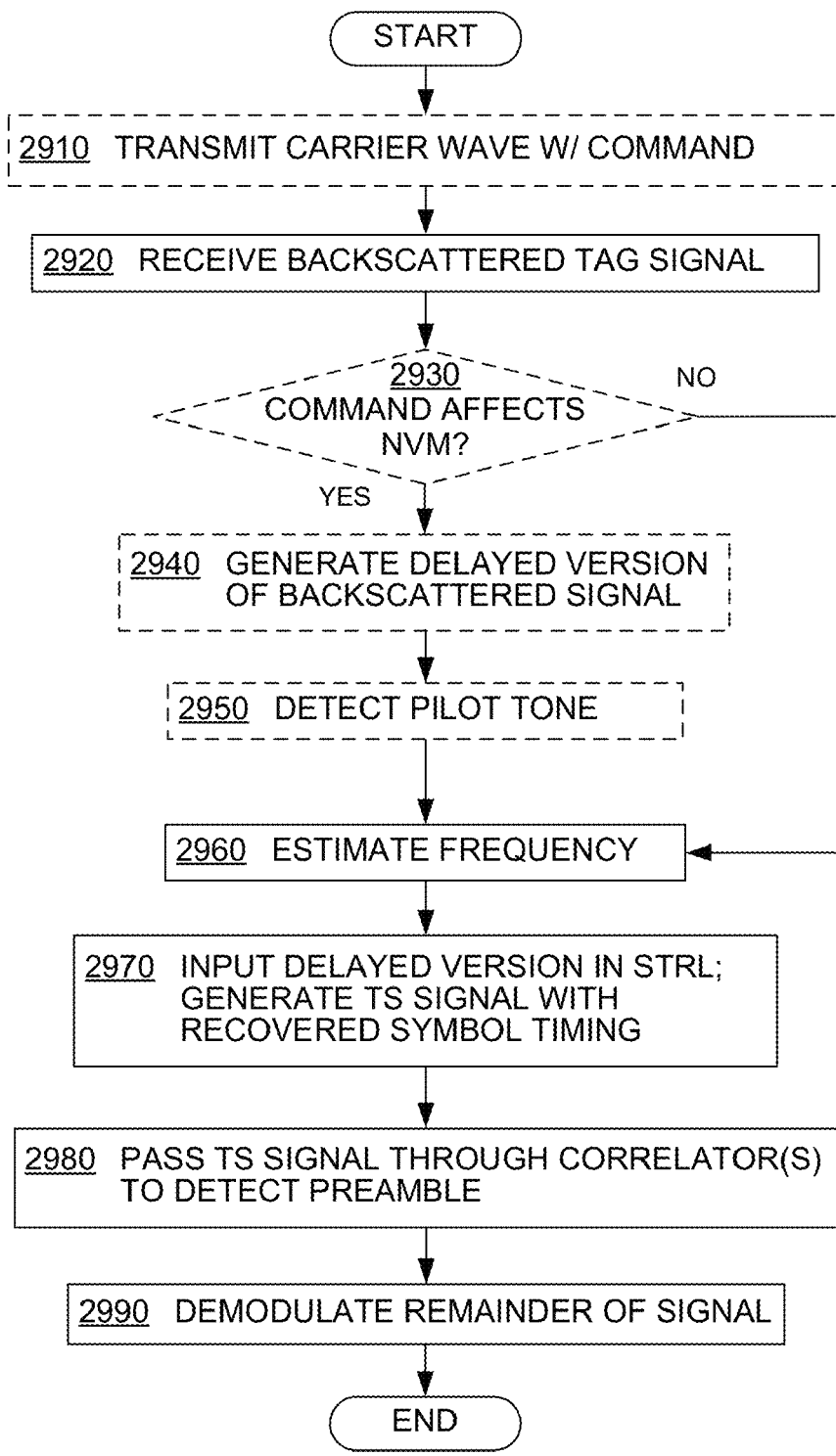
FIG. 29 is a flowchart of a process for using a pilot tone in processing RFID tag signals according to embodiments.

FIG. 29 is a flowchart of a process for using a pilot tone in processing RFID tag signals according to embodiments.

Process 2900 begins at optional operation 2910, where the reader transmits a carrier wave with a command that instructs the tags to respond with a pilot tone.

According to a next operation 2920, a backscattered tag signal is received by the reader.

According to a next decision operation 2930, a determination is made whether the command affects a tag memory such as a Non-Volatile Memory (NVM). If the tag memory is affected, processing advances to optional operation 2940. If the memory is not affected processing proceeds to operation 2960.

At optional operation 2940, a delayed version of the backscattered signal is generated.

At a next optional operation 2950, the backscattered pilot tone in the tag response is detected by comparing the delayed version of the signal to a baseline established from the received signal.

At a next operation 2960, a frequency of the tag response is estimated. The estimated frequency is used to seed a symbol timing recovery loop.

At a next operation 2970, the delayed version of the received signal is provided to the symbol timing recovery loop and recovered tag signal TS generated using the recovered symbol timing.

At a next operation 2980, the recovered tag signal is passed through one or more correlators to detect the preamble of the tag signal.

At a next operation 2990, the remainder of the received tag signal is demodulated.

The operations included in process 2900 are for illustration purposes. Demodulation of a tag response signal by symbol timing recovery based on pilot tone detection may be implemented by similar processes with fewer or additional steps, as well as in different order of operations using the principles described herein.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

The claimed invention is:

1. A method for a Radio Frequency Identification (RFID) reader to detect a pilot tone in a signal backscattered from an RFID tag, comprising:
    generating a threshold from an ambient noise;
    receiving the backscattered signal;
    generating a baseline version by scaling the backscattered signal;
    generating a delayed version by delaying the backscattered signal; and
    detecting the pilot tone when the delayed version exceeds both the threshold and the baseline version.

2. The method of claim 1, in which the tag includes the pilot tone in its backscattered signal responsive to a command from the reader.

3. The method of claim 1, in which the baseline version has a waveform that rises to a cusp and then maintains substantially the cusp value, and the delaying is sufficiently long so that the pilot tone is detected after the cusp.

4. The method of claim 1, in which the pilot tone is detected only if both the delayed version and the baseline version exceed the threshold.

5. The method of claim 1, in which
    the backscattered signal is received responsive to a command from the reader,
    the command causes the tag to be silent during a silent period, and
    the ambient noise is measured during the silent period.

6. The method of claim 1, further comprising using the detected pilot tone to estimate at least one of a frequency of the backscattered signal, a phase of the backscattered signal, and a symbol timing of the backscattered signal.

7. The method of claim 6, further comprising using the at least one estimate to detect at least one of a preamble and data in the backscattered signal.

8. A method for a Radio Frequency Identification (RFID) reader to detect a pilot tone in a signal backscattered from an RFID tag, comprising:
- receiving the backscattered signal;
- generating a baseline version by scaling the backscattered signal;
- generating a delayed version by delaying the backscattered signal; and
- detecting the pilot tone when the delayed version exceeds the baseline version.

9. The method of claim 8, further comprising generating a threshold from an ambient noise and in which the pilot tone is detected only if both the delayed version and the baseline version exceed the threshold.

10. The method of claim 8, in which the tag includes the pilot tone in its backscattered signal responsive to a command from the reader.

11. The method of claim 8, in which the baseline version has a waveform that rises to a cusp and then maintains substantially the cusp value, and the delaying is sufficiently long so that the pilot tone is detected after the cusp.

12. The method of claim 9, in which
- the backscattered signal is received responsive to a command from the reader,
- the command causes the tag to be silent during a silent period, and
- the ambient noise is measured during the silent period.

13. The method of claim 8, further comprising using the detected pilot tone to estimate at least one of a frequency of the backscattered signal, a phase of the backscattered signal, and a symbol timing of the backscattered signal.

14. The method of claim 8, further comprising using the at least one estimate to detect at least one of a preamble and data in the backscattered signal.

15. A Radio Frequency Identification (RFID) reader configured to detect a pilot tone in a signal backscattered from an RFID tag, the reader comprising:
- a memory; and
- a signal-processing module configured to:
  - receive the backscattered signal;
  - generate a baseline version by scaling the backscattered signal;
  - generate a delayed version by delaying the backscattered signal; and
  - detect the pilot tone when the delayed version exceeds the baseline version.

16. The reader of claim 15, wherein the signal-processing module is further configured to generate a threshold from an ambient noise, and in which the pilot tone is detected only if both the delayed version and the baseline version exceed the threshold.

17. The reader of claim 15, in which the reader transmits a command to the tag at least instructing the tag to include the pilot tone in its backscattered signal.

18. The reader of claim 15, in which the baseline version has a waveform that rises to a cusp and then maintains substantially the cusp value, and the delay is sufficiently long so that the pilot tone is detected after the cusp.

19. The reader of claim 16, in which
- the backscattered signal is received responsive to a command from the reader,
- the command causes the tag to be silent during a silent period, and
- the ambient noise is measured during the silent period.

20. The reader of claim 15, wherein the signal-processing module is further configured to use the detected pilot tone to estimate at least one of a frequency of the backscattered signal, a phase of the backscattered signal, and a symbol timing of the backscattered signal.

21. The reader of claim 20, wherein the signal-processing module is further configured to use the at least one estimate to detect at least one of a preamble and data in the backscattered signal.

* * * * *